United States Patent
Nagase et al.

(10) Patent No.: US 11,057,474 B2
(45) Date of Patent: Jul. 6, 2021

(54) COMMUNICATION TERMINAL, COMMUNICATION SYSTEM, AND COMMUNICATION METHOD

(71) Applicant: Ricoh Company, Ltd., Tokyo (JP)

(72) Inventors: Tatsuya Nagase, Kanagawa (JP); Takashi Hasegawa, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 680 days.

(21) Appl. No.: 15/832,889

(22) Filed: Dec. 6, 2017

(65) Prior Publication Data
US 2018/0167465 A1    Jun. 14, 2018

(30) Foreign Application Priority Data
Dec. 13, 2016  (JP) .............................. JP2016-241686

(51) Int. Cl.
*H04L 29/08* (2006.01)
*H04N 7/14* (2006.01)
(Continued)

(52) U.S. Cl.
CPC ........ *H04L 67/141* (2013.01); *H04L 65/1069* (2013.01); *H04L 65/403* (2013.01);
(Continued)

(58) Field of Classification Search
CPC . H04L 67/141; H04L 65/1069; H04L 65/403; H04M 3/567; H04N 7/147; H04N 7/15
(Continued)

(56) References Cited

U.S. PATENT DOCUMENTS

| 2005/0020249 A1* | 1/2005 | Seo ....................... H04M 1/663 455/414.1 |
| 2009/0015659 A1* | 1/2009 | Choi ..................... H04N 7/152 348/14.09 |

(Continued)

FOREIGN PATENT DOCUMENTS

JP          9-167035        6/1997

OTHER PUBLICATIONS

U.S. Appl. No. 15/548,002, filed Aug. 1, 2017, Takeshi Homma, et al.

*Primary Examiner* — Ruolei Zong
(74) *Attorney, Agent, or Firm* — Xsensus LLP

(57) ABSTRACT

A communication terminal includes a memory, an interface, and circuitry. The communication terminal is one of a plurality of communication terminals each of which receives a request for communication start from a source communication terminal. The memory stores identification information of the source terminal in response to the request for communication start. The interface responds to the request for communication start, and receives a request for communication establishment from the source terminal. The request for communication establishment is transmitted from the source terminal when the source terminal selects the communication terminal from the plurality of communication terminals each of which responds to the request for communication start. The circuitry determines whether to respond to the request for communication establishment according to a result of comparison between identification information of the source terminal that sends the request for communication establishment and the identification information stored in the memory.

7 Claims, 21 Drawing Sheets

(51) Int. Cl.
  *H04N 7/15* (2006.01)
  *H04M 3/56* (2006.01)
  *H04L 29/06* (2006.01)
(52) U.S. Cl.
  CPC ............ *H04M 3/567* (2013.01); *H04N 7/147* (2013.01); *H04N 7/15* (2013.01)
(58) Field of Classification Search
  USPC ...................................................... 709/227
  See application file for complete search history.

(56) References Cited

U.S. PATENT DOCUMENTS

| | | | | |
|---|---|---|---|---|
| 2011/0158231 A1* | 6/2011 | Kudo | ................. | H04L 12/1818 370/389 |
| 2013/0191287 A1* | 7/2013 | Gainer, III | ......... | G06Q 20/1085 705/44 |
| 2015/0256998 A1* | 9/2015 | Umehara | ............... | H04W 76/14 370/260 |
| 2016/0036871 A1* | 2/2016 | Tsubone | ................ | H04L 63/083 370/259 |
| 2016/0042226 A1* | 2/2016 | Cunico | .................. | G06N 5/022 382/103 |
| 2016/0057391 A1* | 2/2016 | Block | .................... | H04N 7/152 348/14.07 |
| 2016/0099893 A1 | 4/2016 | Hasegawa et al. | | |
| 2016/0099947 A1 | 4/2016 | Asai et al. | | |
| 2016/0112465 A1 | 4/2016 | Hasegawa et al. | | |
| 2016/0269327 A1 | 9/2016 | Hasegawa et al. | | |
| 2017/0019637 A1 | 1/2017 | Nagase et al. | | |
| 2017/0214681 A1 | 7/2017 | Hinohara et al. | | |
| 2017/0264671 A1 | 9/2017 | Homma et al. | | |
| 2017/0272439 A1 | 9/2017 | Homma et al. | | |

* cited by examiner

FIG. 8A AUTHENTICATION MANAGEMENT TABLE

| COMMUNICATION ID | PASSWORD |
|---|---|
| C01 | aaaa |
| ... | ... |
| O01 | abab |
| ... | ... |

FIG. 8B TERMINAL MANAGEMETN TABLE

| COMMUNICATION ID | COMMUNICATION TERMINAL IP ADDRESS |
|---|---|
| C01 | 1.2.1.3 |
| ... | ... |
| O01 | 1.3.2.3 |
| ... | ... |

FIG. 8C DESTINATION MANAGEMENT TABLE

| COMMUNICATION ID | PRESENCE | ATTRIBUTE INFORMATION |
|---|---|---|
| O01 | CHAT | en,zh,es |
| O02 | ONLINE | en,es,pt,ru,th |
| O03 | OFFLINE | ko,pt |

FIG. 8D PRESENCE MANAGEMENT TABLE

| ATTRIBUTE INFORMATION | GROUP PRESENCE | AVAILABLE COMMUNICATION ID | BUSY COMMUNICATION ID |
|---|---|---|---|
| en | ONLINE | O02 | |
| zh | OFFLINE | | |
| ko | ONLINE | O03 | |
| pt | ONLINE | O02, O03 | |
| es | ONLINE | O02 | |
| th | ONLINE | O03 | |
| ru | ONLINE | O02 | |

FIG. 8E CALL CONTROL INFORMATION MANAGEMENT TABLE

| COMMUNICATION ID | CALL RECEIVING TIME | ATTRIBUTE INFORMATION |
|---|---|---|
| C01 | 2016/08/23 15:00:10 | en |

FIG. 9

LOGIN

COMMUNICATION ID

O01

PASSWORD abab

LANGUAGE

- ☑ English
- ☑ Chinese
- ☐ Korean
- ☐ Portuguese
- ☑ Spanish
- ☐ Thai
- ☐ Russian

OK

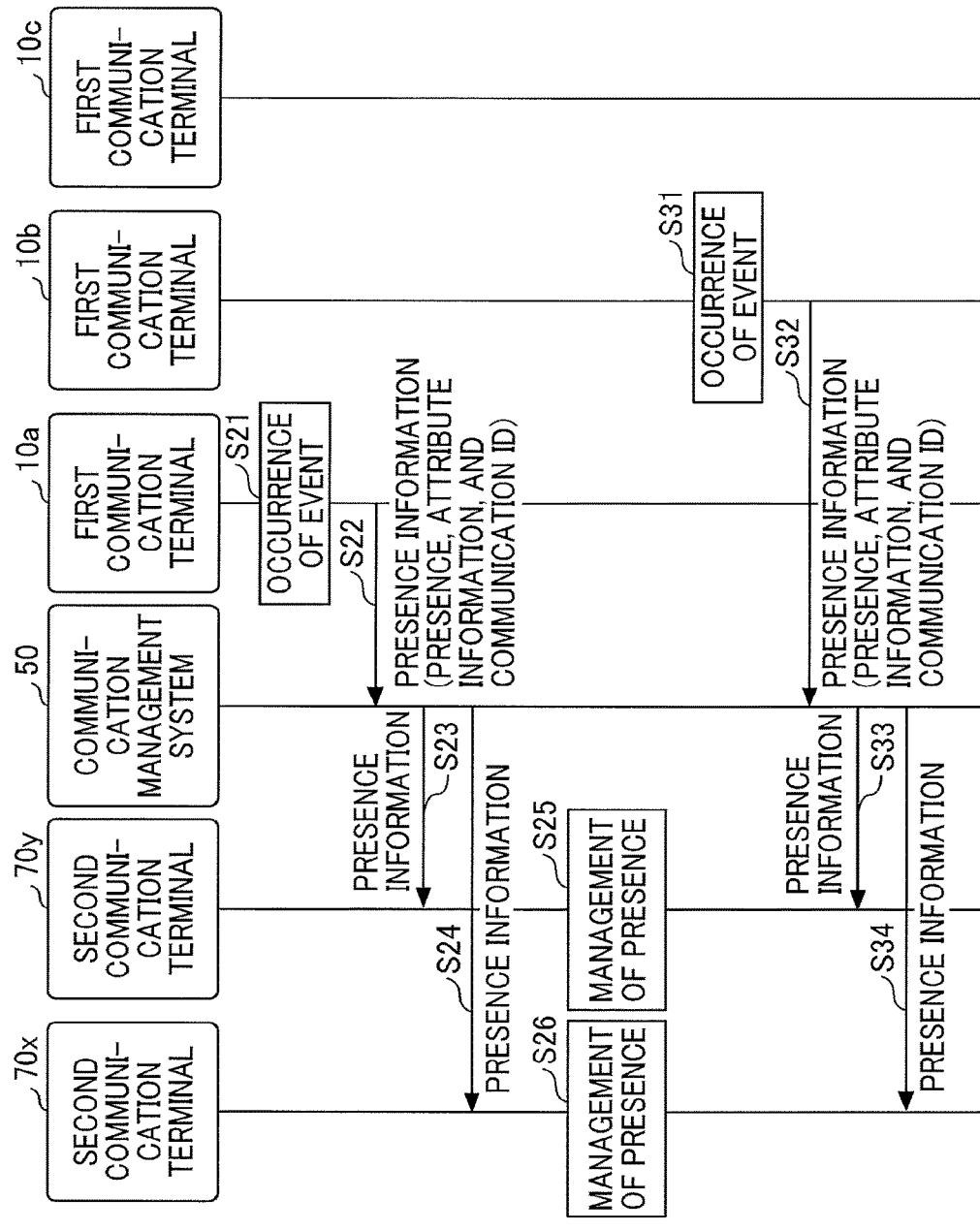

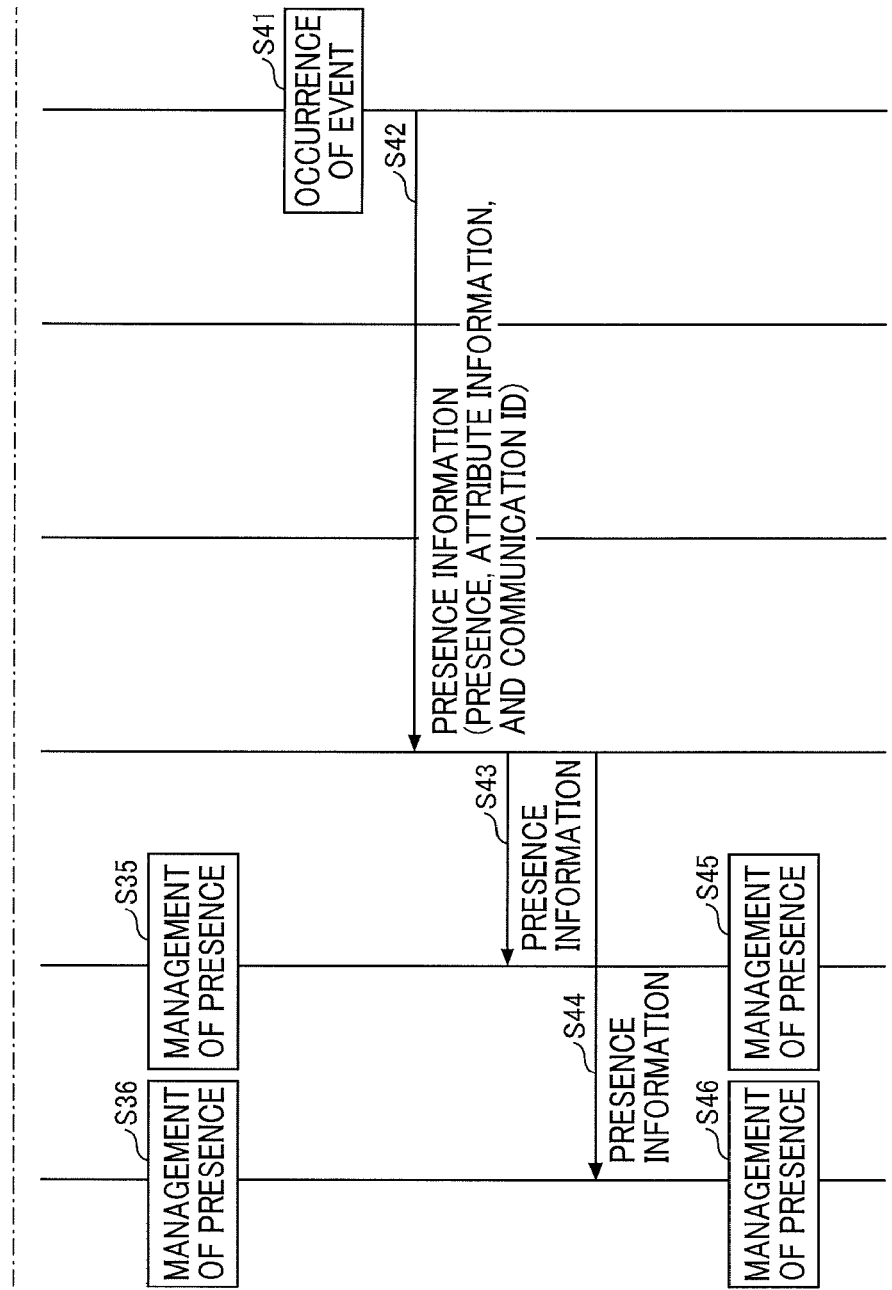

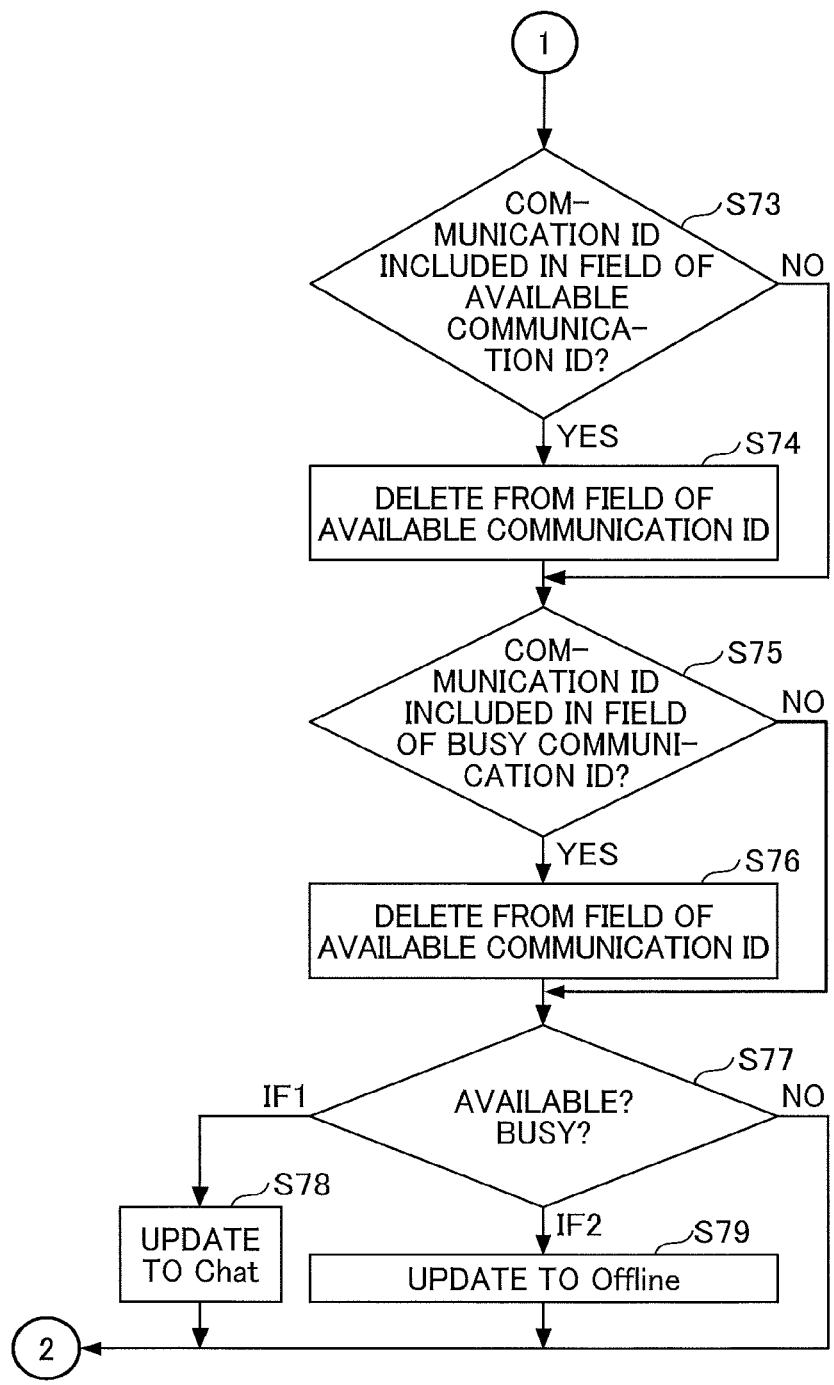

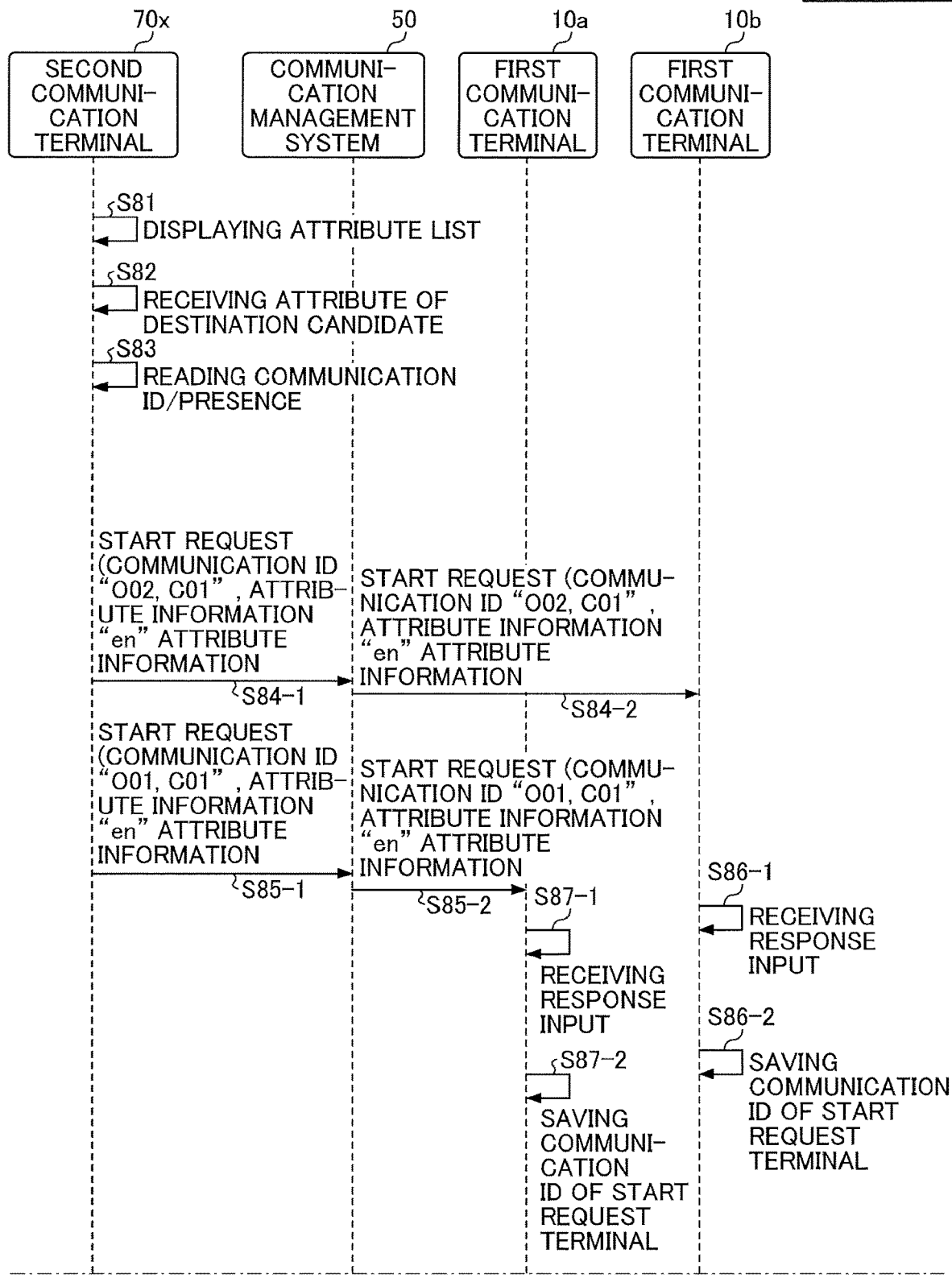

FIG. 15

R HOSPITAL FRONT

Select Department

☑ Internal Medicine

☑ Surgery

☐ Pediatrics

☑ Ophthalmology

☑ Otolaryngology

☑ Dermatology

☑ Dentistry

COMMUNICATION TERMINAL, COMMUNICATION SYSTEM, AND COMMUNICATION METHOD

CROSS-REFERENCE TO RELATED APPLICATION

This patent application is based on and claims priority pursuant to 35 U.S.C. § 119(a) to Japanese Patent Application No. 2016-241686, filed on Dec. 13, 2016, in the Japan Patent Office, the entire disclosure of which is hereby incorporated by reference herein.

BACKGROUND

Technical Field

Embodiments of the present disclosure relate to a communication terminal, a communication system, and a communication method.

Related Art

Using such a known video translation service utilizing a videoconference system, a user is connected with an operator, waiting in a call center remotely located, to communicate face to face.

In the known video translation service, the operator does not answer, but an automatic response system starts, without any conditions, a communication with the user for a purpose of starting the communication smoothly, when receiving a communication establishment request (call).

SUMMARY

A communication terminal includes a memory, an interface, and circuitry. The communication terminal is one of a plurality of communication terminals each of which receives a request for communication start from a source communication terminal. The memory stores identification information of the source terminal in response to the request for communication start. The interface responds to the request for communication start, and receives a request for communication establishment from the source terminal. The request for communication establishment is transmitted from the source terminal when the source terminal selects the communication terminal from the plurality of communication terminals each of which responds to the request for communication start. The circuitry determines whether to respond to the request for communication establishment according to a result of comparison between identification information of the source terminal that sends the request for communication establishment and the identification information stored in the memory.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 8A to 8E are examples of tables used by the second communication terminal and the communication management system according to the first embodiment;

FIG. 9 is an illustration of an example of a reception screen displayed with the first communication terminal according to the first embodiment;

FIG. 10A and FIG. 10B (FIG. 10) are a sequence diagram for explaining an example of operation of transmitting presence information according to the first embodiment;

FIG. 11A and FIG. 11B (FIG. 11) are a flowchart illustrating operation of acquiring presence for an attribute according to the first embodiment;

FIG. 12A and FIG. 12B (FIG. 12) is a sequence diagram illustrating an example of operation of starting a communication according to the first embodiment;

FIG. 15 is an illustration of another example of the attribute list displayed with the second communication terminal according to a second embodiment.

Figure 1:
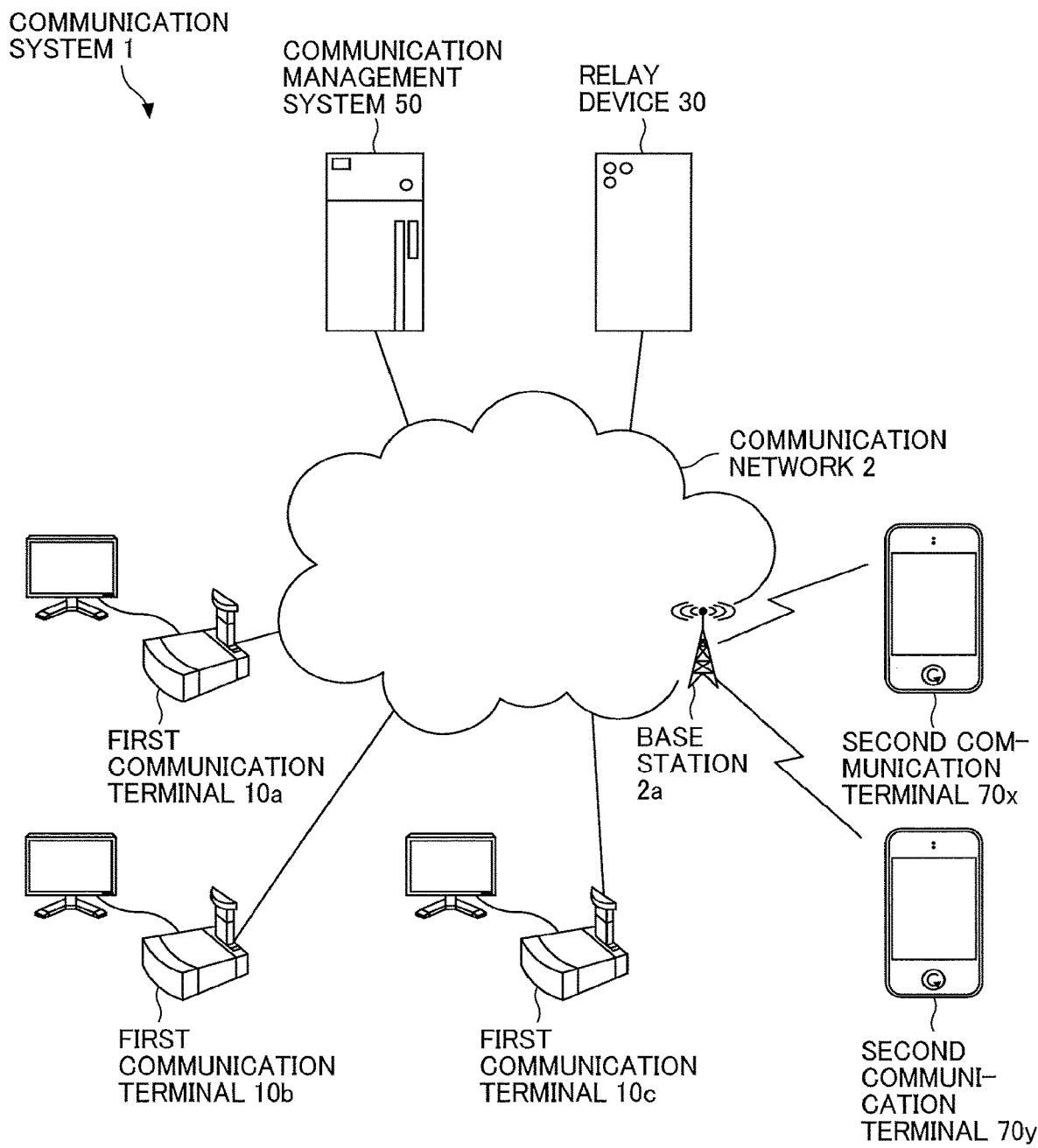
FIG. 1 is a diagram illustrating an example of a configuration of a communication system according to a first embodiment of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Referring to the drawings, some embodiments of the present disclosure are described.

Configuration of Communication System 1

FIG. 1 is a diagram illustrating an example of a configuration of a communication system 1 according to a first embodiment. The communication system 1 illustrated in FIG. 1 includes a first communication terminal 10a, a first communication terminal 10b, a first communication terminal 10c, a second communication terminal 70x, a second communication terminal 70y, a communication management system 50, and a relay device 30. The communication management system 50 manages the first communication terminals 10a, 10b, and 10c, and the second communication terminal 70x and 70y.

In FIG. 1, there are three first communication terminals 10a, 10b and 10c, and two second communication terminals 70x and 70y illustrated, however, the embodiment is not limited to these number. An arbitrary one(s) or all of the first communication terminals 10a, 10b, and 10c is/are, individually or collectively, referred to as "first communication terminal 10", and an arbitrary one(s) or all of the second communication terminals 70x and 70y is (are), individually or collectively, referred to as "second communication terminal 70". For example, a videoconference terminal is an example of the first communication terminal 10. A smartphone is an example of the second communication terminal 70. Other examples of the first communication terminal 10 and the second communication terminal 70 include a general-purpose computer having a communication function, an electronic whiteboard, a car navigation communication terminal, and an electronic signage (digital signage).

The communication management system 50 is a computer having a server function. Each of the first communication terminal 10 and the second communication terminal 70 has a client function that corresponds to the server function. The first communication terminal 10, the second communication terminal 70, the relay device 30 and the communication management system 50 are communicably connected with each other through or via a communication network 2 such as the Internet, a mobile phone network, a Local Area Network (LAN), Wireless Fidelity (Wi-Fi), and Bluetooth (registered trademark). The communication network 2 also includes a base station 2a at the end of the mobile phone network. In FIG. 1, there is one base station 2a illustrated, however, the embodiment is not limited to this number.

The relay device 30 relays content data such as audio (sound) data, video (image) data and text (character) data between the first communication terminal 10 and the second communication terminal 70.

The first communication terminal 10 is provided in a call center, for example. The second communication terminal 70 is provided, for example, at a front desk in a hotel. The communication management system 50, the relay device 30, the first communication terminal 10, and the second communication terminal 70 are placed in the same country or the same region, or, alternatively, in different countries and different regions. A user of the first communication terminal 10 is, for example, an operator, and a user of the second communication terminal 70 is, for example, a customer.

<<Example of Hardware Configuration According to First Embodiment>>

Figure 2:
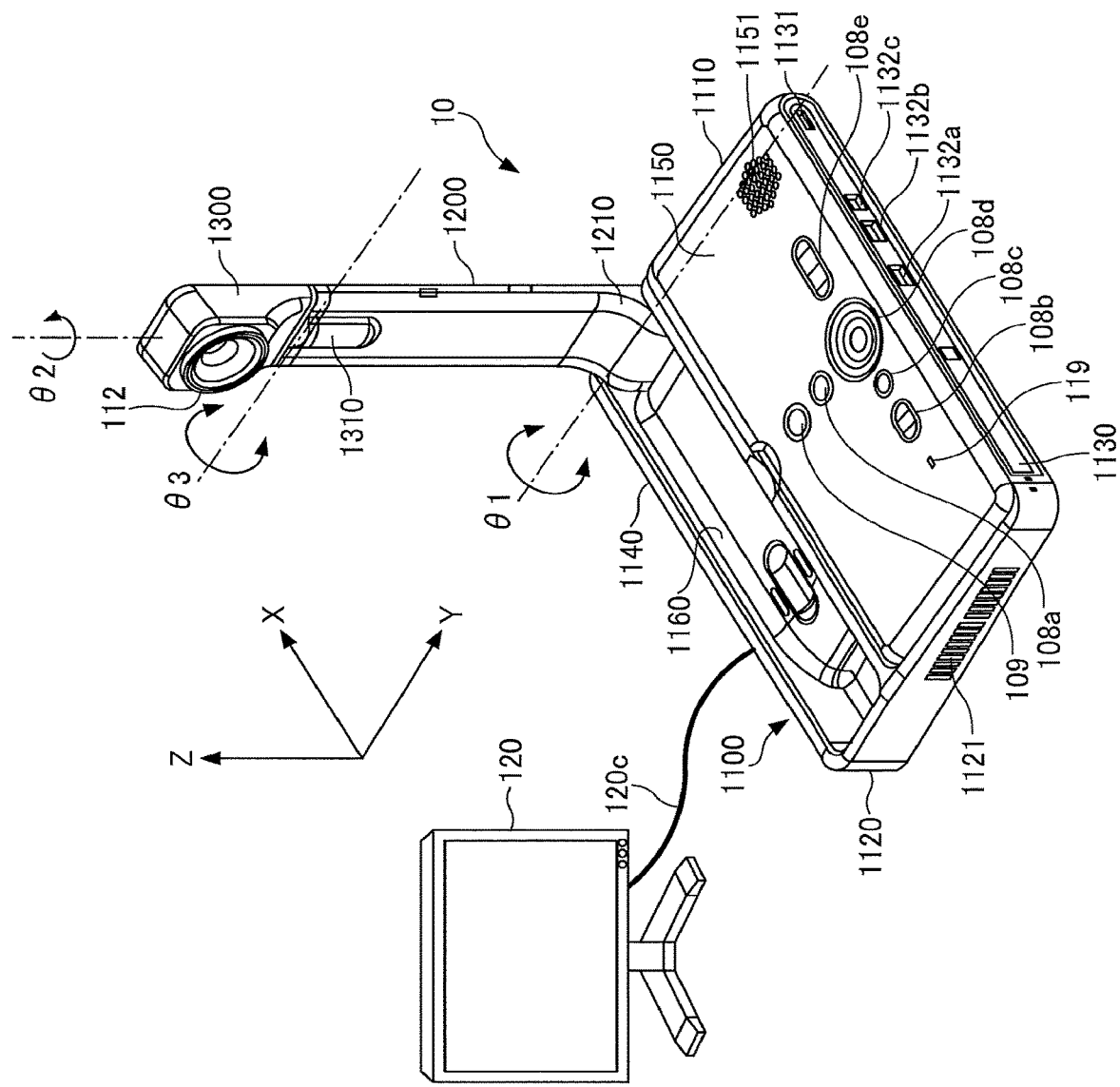
FIG. 2 is an external view illustrating an example of a first communication terminal according to the first embodiment.

An example of a hardware configurations of each of the first communication terminal 10, the second communication terminal 70, and the communication management system 50 according to the first embodiment is described. FIG. 2 is an external view illustrating an example of the first communication terminal 10 according to the first embodiment. As illustrated in FIG. 2, when being a videoconference terminal, the first communication terminal 10 includes a casing 1100, an arm 1200, and a camera housing 1300. A front side wall 1110 of the casing 1100 includes an intake surface having a plurality of air intake holes formed over the nearly entire surface of the intake surface. A back side wall 1120 of the casing 1100 includes an exhaust surface 1121 having a plurality of exhaust holes formed over the nearly entire surface of the exhaust surface 1121. When a cooling fan built in the casing 1100 is driven, air behind the first communication terminal 10 is taken in via the inlet face and exhausted to the rear of the first communication terminal 10 via the exhaust surface 1121. Through a sound pickup hole 1131, a microphone 114 of the first communication terminal 10 is able to catch sounds such as human voice or any sound including noise.

The casing 1100 has an operation panel 1150, which is provided at a front surface toward the right side wall 1130. The operation panel 1150 includes a plurality of operation keys 108a to 108e, a power switch 109, which is described later, an alarm lump 119, which is described later, and a plurality of sound output holes 1151. Through the sound output holes 1151, a speaker 115, which is described later, of the first communication terminal 10 is able to output sound such as sound generated based on human voice. The casing 1100 further includes a holder 1160, which is provided at the front surface toward the left side wall 1140. The holder 1160, which has a concave shape, accommodates therein the arm 1200 and the camera housing 1300. The right side wall 1130 of casing 1100 is further provided with a plurality of connection ports 1132a to 1132c ("connection ports 1132"). The connection ports 1132 allow electrical connection to connect an external device through an external device connection I/F 118. The casing 1100 further includes a left side wall 1140, which is provided with a connection port to connect a display 120 to an external device connection interface OF 118 through a cable 120c.

The following description uses the tell "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210. With the torque hinge 1210, the arm 1200 is rotatable in directions of up and down with respect to the casing 1100, while making a tilt angle θ1 of up to 135 degrees. In FIG. 2, tilt angle θ1 is 90 degrees. The camera housing 1300 includes a built-in camera 112 that captures an image of an object such as a user, a document, and a room. The camera housing 1300 is formed with a torque hinge 1310. The camera housing 1300 is attached to the arm 1200 with the torque hinge 1310. With the torque hinge 1310, the camera housing 1300 is rotatable with respect to the arm 1200, in the direction of up, down, right, and left, such that the camera housing 1300 is kept at a desired position. More specifically, the camera housing 1300 is rotatable, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

Note that the external view illustrated in FIG. 2 is exemplary and the appearance is not limited to this. The second communication terminal 70, the relay device 30 and the communication management system 50 each have the same appearance as that of a general smartphone or a server computer and the a description of the appearance of them is omitted.

Figure 3A:
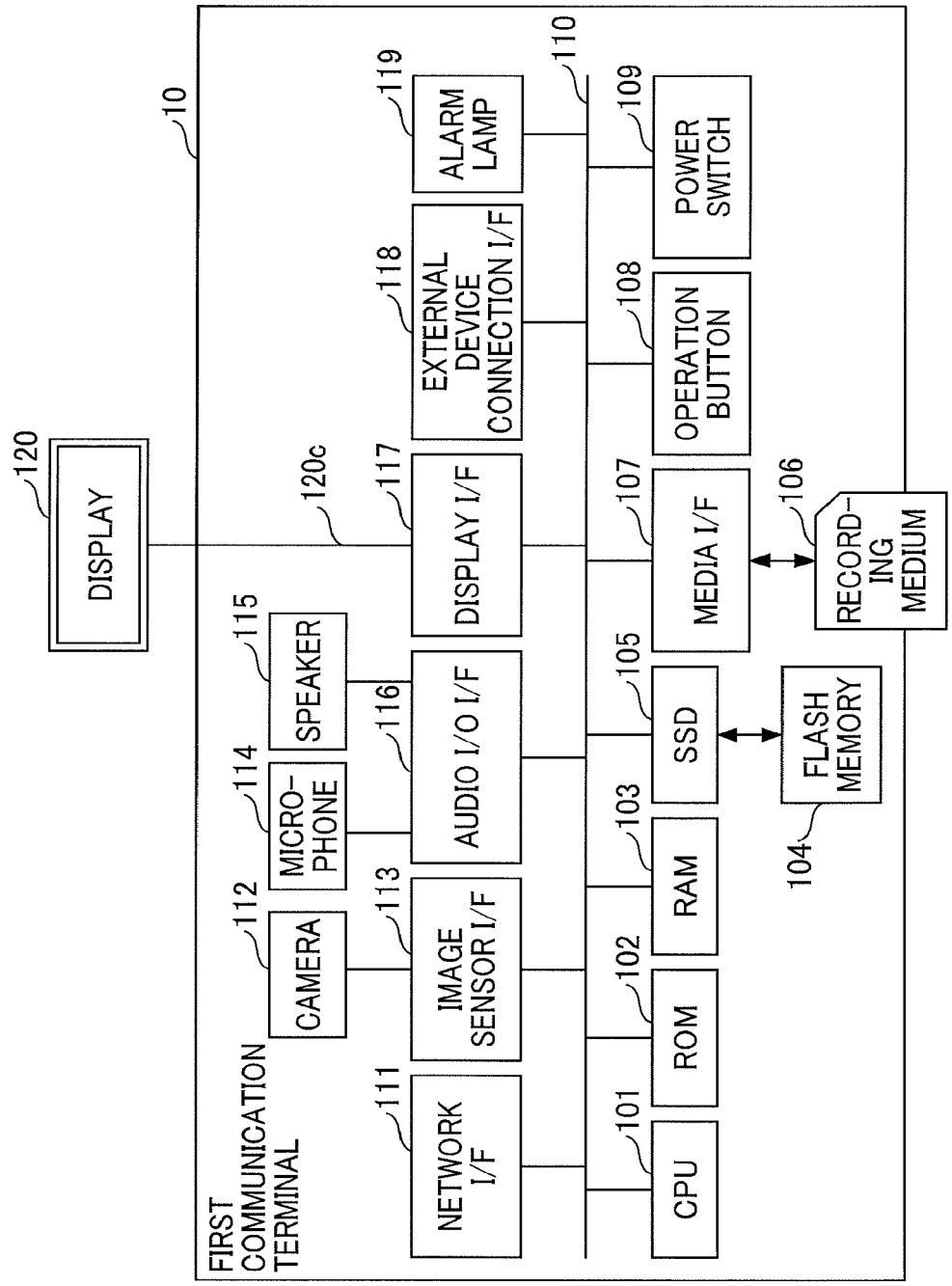
FIG. 3A and FIG. 3B are block diagrams illustrating examples of hardware configurations of the first communication terminal and a second communication terminal, respectively, according to the first embodiment.
Figure 3B:
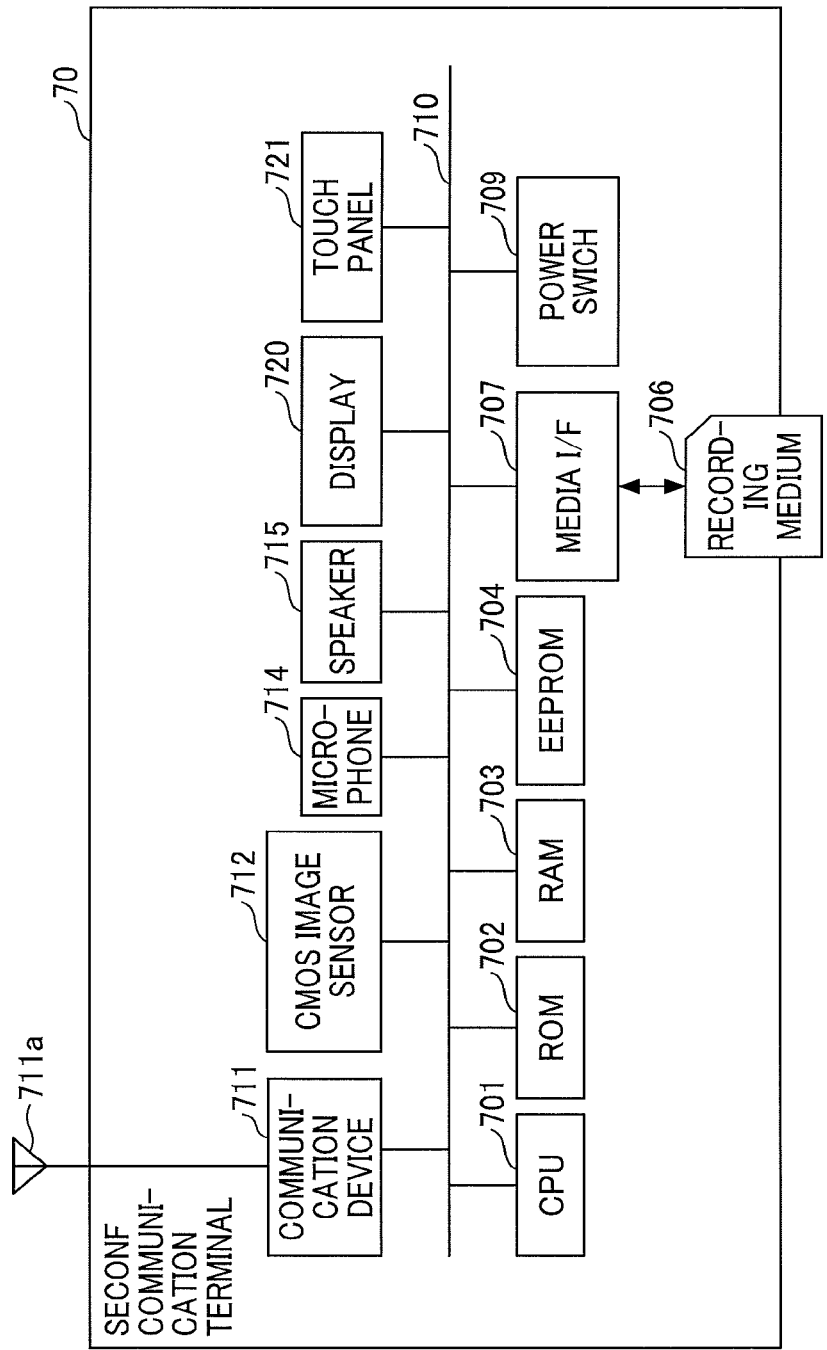

FIGS. 3A and 3B are block diagrams illustrating example hardware configurations of the first communication terminal 10 and the second communication terminal 70, respectively, according to the first embodiment. FIG. 3A illustrates the hardware configuration of the first communication terminal 10. The first communication terminal 10 includes a central processing unit (CPU) 101 that controls entire operation of the first communication terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as a terminal control program, image data, and audio data, a solid state drive (SSD) 105 that controls reading/writing of various types of data from/to the flash memory 104 under control of the CPU 101, a medium I/F 107 (such as a medium drive) that controls reading/writing (storage) of data from/to a recording medium 106 such as a flash memory or an IC card, the operation keys 108 operated in a case of, for example, selecting a counterpart terminal of the first communication terminal 10, the power switch 109 for turning on/off the power of the first communication terminal 10, and a network interface (I/F) 111 for transmitting data using the communication network 2. The ROM 102 may be a rewritable flash memory or the like.

The first communication terminal 10 further includes the built-in camera 112 that captures an image of an object and obtains image data under control of the CPU 101, an imaging element I/F 113 that controls driving of the camera 112, the built-in microphone 114 that receives a sound input, the built-in speaker 115 that outputs sound, a sound input/output I/F 116 that processes inputting/outputting of a sound signal between the microphone 114 and the speaker 115 under control of the CPU 101, a display IX 117 that transmits image data to an external display 120 under control of the CPU 101, the external device connection I/F 118 for connecting various external devices, an alarm lump 119 to inform abnormality of each function of the first communication terminal 10, and a bus line 110 such as an address bus and a data bus for electrically connecting the above-described elements as illustrated in FIG. 3.

The display 120 is, for example, formed of liquid crystal or organic electroluminescence (EL), and displays an image of a subject, an operation icon, or the like. The display 120 is connected to the display OF 117 with a cable 120c. The cable 120c is, for example, an analog red green blue (RGB) (video graphic array (VGA)) signal cable, a component video cable, a high-definition multimedia interface (HDMI (registered trademark)) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) image sensor is used.

The external device connection I/F 118 is capable of connecting an external device such as an external camera, an external microphone, or an external speaker by using a Universal Serial Bus (USB) cable that is inserted into the connection port 1132 or the like. When an external camera is connected, the external camera is driven under control of the CPU 101. Similarly, in a case where an external microphone is connected or an external speaker is connected, the external microphone or the external speaker is driven under control of the CPU 101.

The recording medium 106 is removable from the first communication terminal 10. Additionally, any non-volatile memory that reads and writes data under the control of the CPU 101, such as an electrically erasable and programmable read only memory (EEPROM), may be used instead of the flash memory 104.

FIG. 3B illustrates the hardware configuration of the second communication terminal 70. The second communication terminal 70 includes a CPU 701 that controls overall operation of the second communication terminal 70, a ROM 702 that stores a program, a RAM 703 used as a work area for driving the CPU 701, an electrically erasable programmable ROM (EEPROM) 704 that reads and writes data under control of the CPU 701, a media I/F 707 that controls reading or writing (storing) of a recording media 706 such as a flash memory, and a CMOS image sensor 712 that captures an image of an object and obtains image data representing the image under control of the CPU 701. The ROM 702 may be a rewritable flash memory or the like.

The EEPROM 704 stores an operating system (OS) and other programs executed by the CPU 701, and various data. The EEPROM 704 is replaceable with a flash memory or the like. The CMOS image sensor 712 is a charge coupled device that converts an image of an object into electronic data through photoelectric conversion. The CMOS image sensor is replaceable with a CCD image sensor.

The second communication terminal 70 further includes a microphone 714 that converts sound into an audio signal, a speaker 715 that converts the audio signal into sound, a communication device 711 that uses an antenna 711a to communicate with the base station 2a, which is the closest satiation, with a wireless signal, a display 720, such as a liquid crystal and organic electroluminescence (EL) display, to display an image of an object and various icons, a touch panel 721, such as a pressure-sensitive panel and an electrostatic panel, to detect a position where a finger or a touch pen touch on the display 720, and a bus line 710 such as an address bus and a data bus to electrically connects the above-mentioned components to each other.

Figure 4:
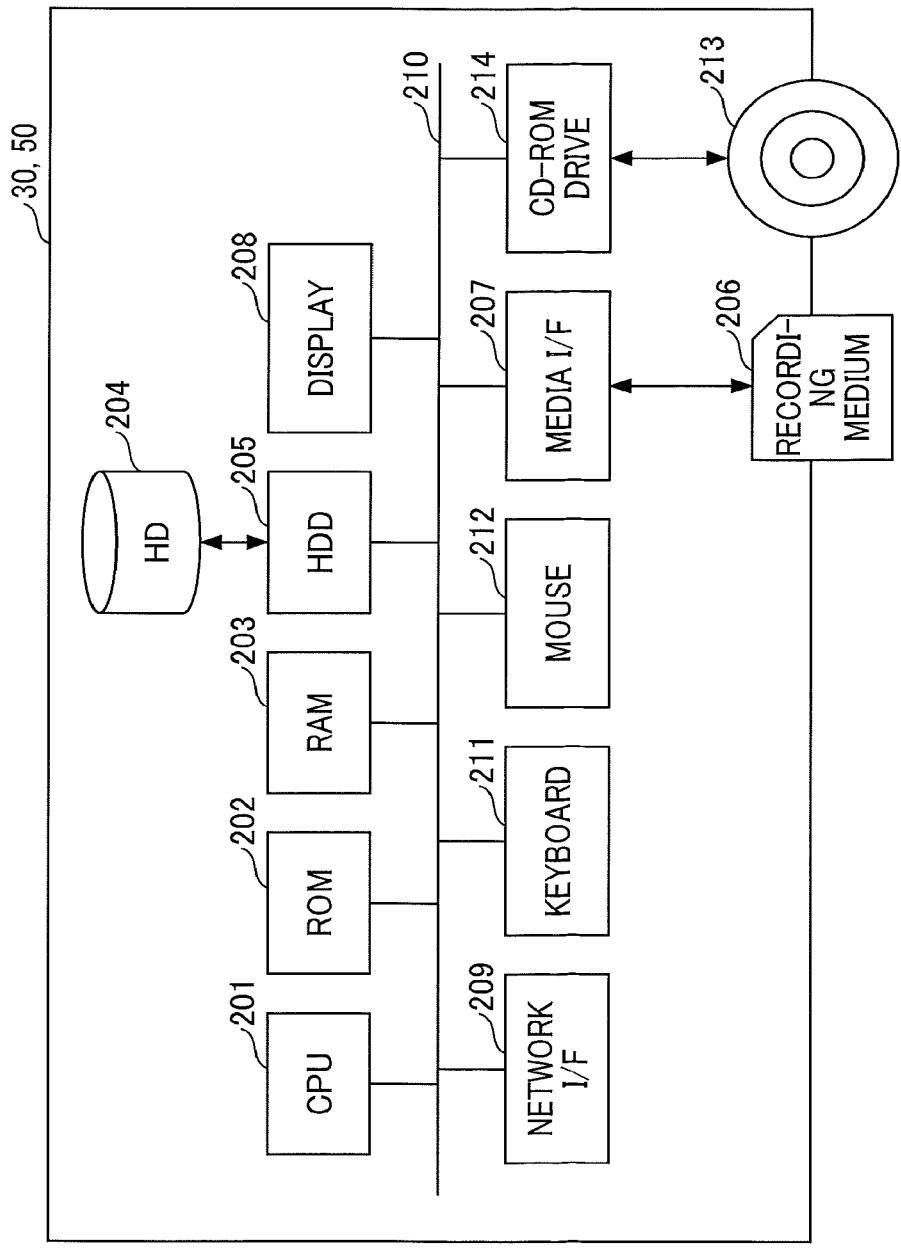
FIG. 4 is a block diagram illustrating an example of a hardware configuration of a communication management system according to the first embodiment.

FIG. 4 is a block diagram illustrating an example of a hardware configuration of a communication management system 50 according to the first embodiment. The communication management system 50 as illustrated in FIG. 4 includes a CPU 201 that controls entire operation of the communication management system 50, a ROM 202 that stores a program used for driving the CPU 201 such as an LPL, a RAM 203 used as a work area for the CPU 201, the Hard Disk (HD) 204 that stores various types of data such as the communication management program, a hard disk drive (HDD) 205 that controls reading/writing of various types of data from/to the HD 204 under control of the CPU 201, a medium I/F 207 (such as a medium drive) that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a (Compact Disc-ROM) CD-ROM 213 serving as an example of a removable recording medium, and a bus line 210 such as an address bus and a data bus for electrically connecting the above-described elements.

A hardware configuration of the relay device 30 is equivalent to that of the communication management system 50.

Hereinafter, an application software is referred to as an "application".

Figure 5A:
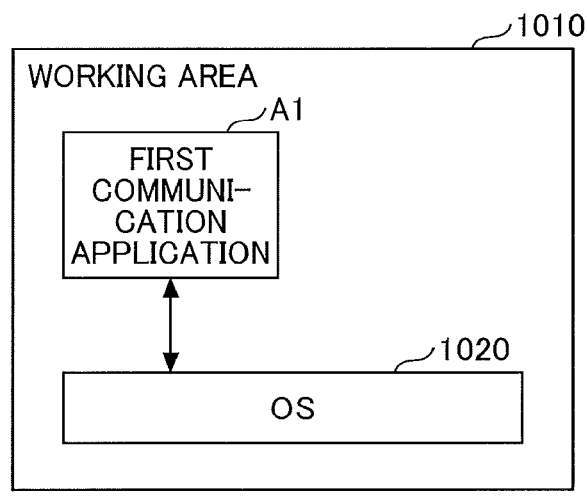
FIG. 5A and FIG. 5B are block diagrams illustrating examples of software configurations of the first communication terminal and the second communication terminal, respectively, according to the first embodiment.
Figure 5B:
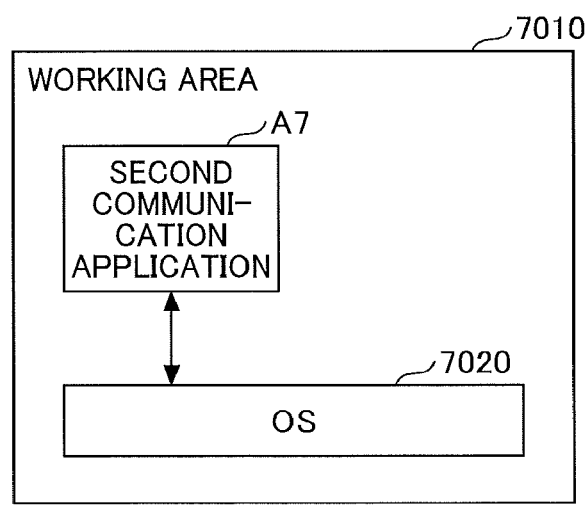

FIG. 5A and FIG. 5B are block diagrams illustrating examples of software configurations of the first communication terminal 10 and the second communication terminal 70, respectively, according to the first embodiment. FIG. 5A illustrates the software configuration of the first communication terminal 10. The first communication terminal 10 is installed with a first communication application A1 as a client application. Additionally, the first communication terminal 10 is installed with an Operating System (OS) 1020. The OS 1020 and the first communication application A1 operate on a working area 1010 of the RAM 103 of the first communication terminal 10. The OS 1020 is basic software that provides basic functions and controls overall operation of the first communication terminal 10. The first communication application A1 is an application for communicating with other communication terminals.

FIG. 5B is the example software configuration of the second communication terminal 70. The second communication terminal 70 is installed with a second communication application A7 that is a client application. Additionally the second communication terminal 70 is installed with an OS 7020. The OS 7020 and the second communication application A7 operate on a working area 7010 of the RAM 703. The OS 7020 is basic software that provides basic functions and controls overall operation of the second communication terminal 70. The second communication application A7 is an application for communicating with other communication terminals.

Examples of communication protocols of the first communication application A1 and the second communication application A7 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol. The protocol, (4) Instant Messenger, is for example a protocol that is used for a service including (4-1) Extensible Messaging and Presence Protocol (XMPP), (4-2) ICQ (registered trademark), AIM (registered trademark), and Skype (registered trademark). Additionally, the protocol, (7) extended IM based protocol is Jingle, for example.

<<Functional Configuration of Embodiment>>

Figure 6A:
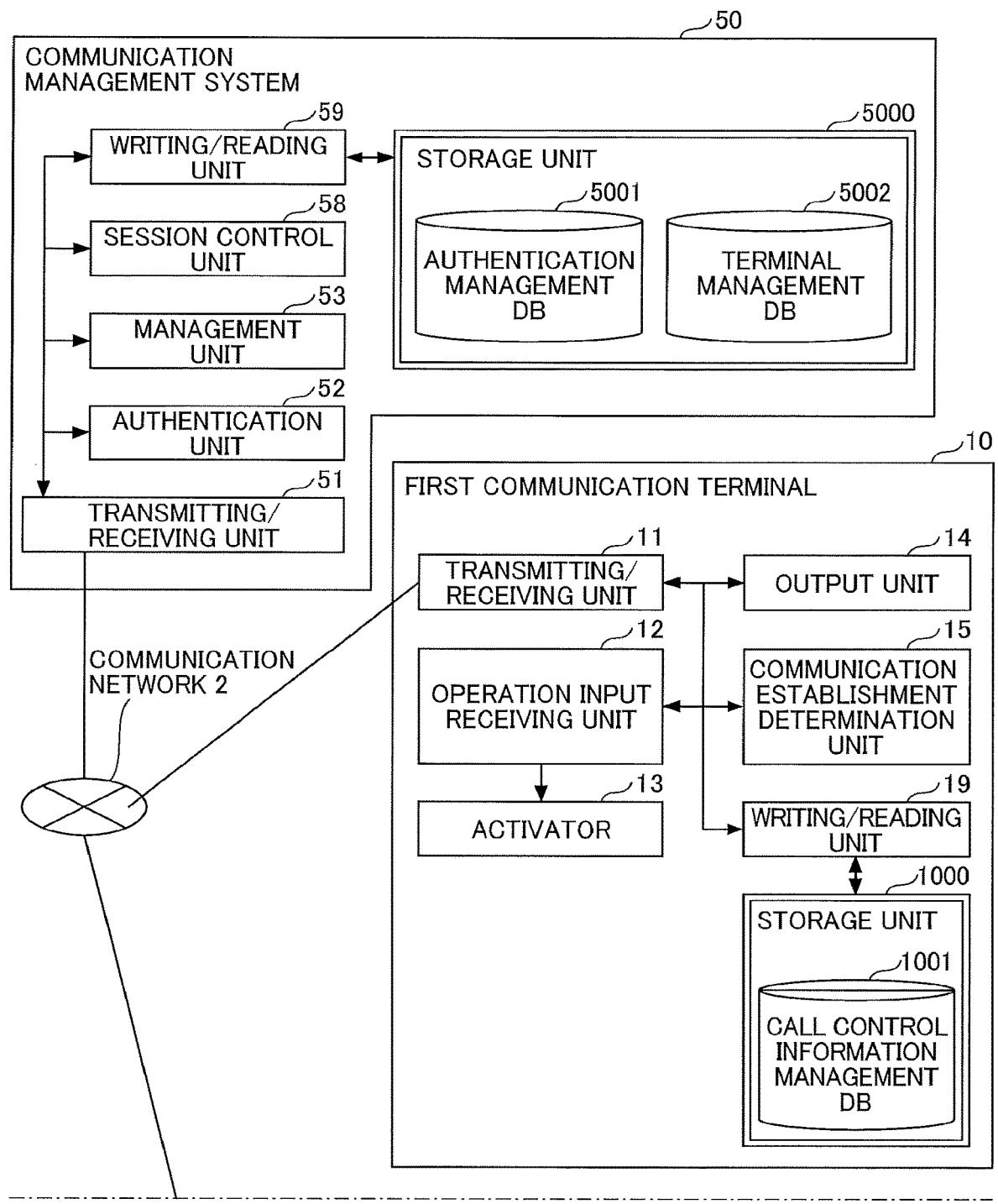
FIG. 6A and FIG. 6B (FIG. 6) are a schematic block diagram illustrating a functional configuration of the first communication terminal, the second communication terminal, and the communication management system in the communication system according to the first embodiment.
Figure 6B:
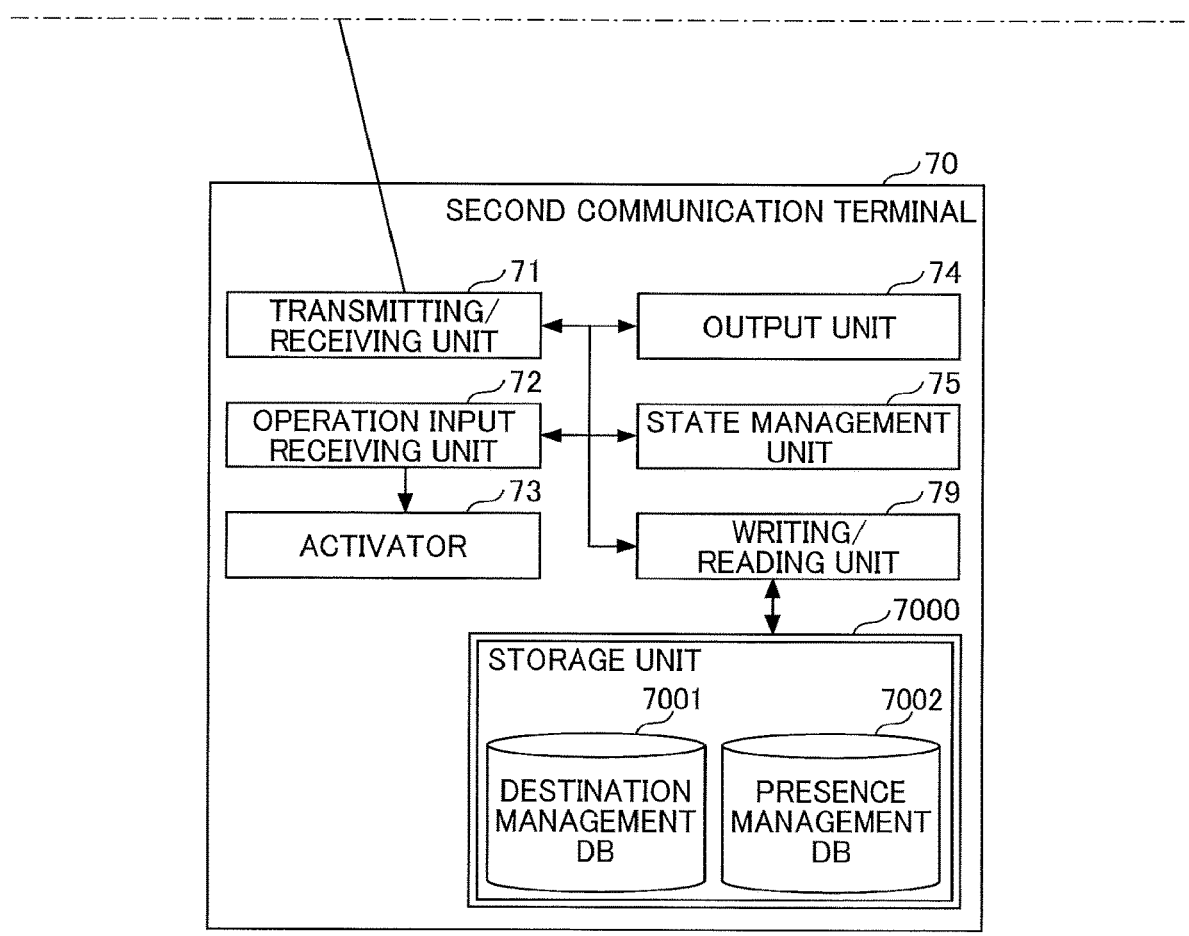

A functional configuration of the communication system 1 according to the first embodiment is described below. FIG. 6A and FIG. 6B (FIG. 6) are a schematic block diagram illustrating functional configurations of the first communication terminal 10, the second communication terminal 70, and the communication management system 50 included in the communication system 1 according to the first embodiment.

<Functional Configuration of Communication Terminals>

The first communication terminal 10 includes a transmitting/receiving unit 11, an operation input receiving unit 12, an activator 13, an output unit 14, a communication establishment determination unit 15, and a writing/reading unit 19. These elements are functions that are implemented by operation of some of the hardware components illustrated in FIG. 3A according to the instructions from the CPU 101 executing a program, such as the first communication application A1 and the OS 1020, read from the flash memory 104 onto the RAM 103. The second communication terminal 70 includes a transmitting/receiving unit 71, an operation input receiving unit 72, a activator 73, an output unit 74, a writing/reading unit 79, and a state management unit 75. These elements are functions that are implemented by operation of some of the hardware components illustrated in FIG. 3B according to the instructions from the CPU 701 executing a program, such as the second communication application A7 and the OS 7020, read from the flash memory 704 onto the RAM 703.

The first communication terminal 10 further includes a storage unit 1000 that is implemented with the ROM 102, RAM 103, or flash memory 104 of FIG. 3A. The second communication terminal 70 further includes a storage unit 7000 that is implemented with the ROM 702, RAM 703, or flash memory 704 of FIG. 3B.

The transmitting/receiving unit 11 uses the network I/F 111 to transmit or receive various data (or information) to or from counterpart terminals, devices and systems, through the communication network 2.

The operation input receiving unit 12 receives various inputs or selections from a user with the operation keys (108a, 108b, 108c, 108d, 108e) or the power switch 109.

The activator 13 activates the first communication application A1.

The output unit 14 outputs image data and audio data to the display I/F 117 and the sound input/output I/F 116.

The communication establishment determination unit 15 determines whether a communication is established.

The writing/reading unit 19 writes data in the storage unit 1000 and reads data from the storage unit 1000. The storage unit 1000 includes call control information management database 1001 (hereinafter, referred to as a call control information management DB 1001). A detailed description of the call control information management DB 1001 is deferred.

The transmitting/receiving unit 71 uses the communication device 711 to transmit or receive data (or information) to or from each of the counterpart terminals (first communication terminal 10), devices or systems through the communication network 2.

The operation input receiving unit 72 receives inputs or selections from a user via the touch panel 721.

The state management unit 75 manages a state of a destination candidate based on presence information sent from the first communication terminal 10 to the second communication terminal 70. The destination candidate is a candidate of a counterpart that is the first communication terminal 10. The destination candidate may be, hereinafter, referred to as a candidate counterpart. The presence information includes communication identification information (ID), presence, and attribute information of the candidate counterpart. The communication ID includes ID of the first communication terminal 10 and ID of the second communication terminal 70. As the communication ID, for example, a user ID and an account of the user of the first communication terminal 10. The presence is information indicating, for example, a state such as a communicable state or a non-communicable state. The attribute is, for example, language, more specifically, available languages. The attribute, the language includes, such as "English", "Korean", "Spanish, and Thai", that are selectable languages. Attribute information corresponding to the language, "English", "Chinese", "Korean", "Portuguese", "Spanish", "Thai", and "Russian" are represented as "en", "zh", "ko", "pt", "es", "th", and "ru", respectively.

The writing/reading unit 79 writes data in the storage unit 7000 and reads data from the storage unit 7000. The storage unit 7000 includes destination management database 7001 (hereinafter, referred to as a destination management DB 7001) and presence management database 7002 (hereinafter, referred to as a presence management DB 7002). A detailed description of each of the destination management DB 7001 and the presence management DB 7002 is deferred.

<Functional Configuration of Communication Management System>

The communication management system 50 includes a transmitting receiving unit 51, an authentication unit 52, a management unit 53, a session control unit 58, and a writing/reading unit 59. These elements are functions that are implemented by operation of some of the hardware components illustrated in FIG. 4 according to the instructions from the CPU 201 executing a program for the communication management system 50 read from the HD 204 onto the RAM 203. The communication management system 50 also includes a storage unit 5000 that is implemented with the HD 204. The storage unit 5000 includes destination management database 5001 (hereinafter, referred to as an authentication management DB 5001) and terminal management database 5002 (hereinafter, referred to as a terminal management DB 5002). A detailed description of each of the authentication management DB 5001 and the terminal management DB 5002 is deferred.

The transmitting/receiving unit 51 uses the network I/F 209 to transmit or receive data (or information) to or from each of the first communication terminal 10, the second communication terminal 70, the devices, or systems through the communication network 2.

The authentication unit 52 searches the authentication management DB 5001 using a communication ID and a password received at the transmitting/receiving unit 51, as a search key, to authenticate the first communication terminal 10 and the second communication terminal 70 based on determination of whether the same communication ID and the same password are stored in the authentication management DB 5001. The authentication management DB 5001 includes a communication ID and a password stored as to be associated to each other, of each of the first communication terminal 10 and the second communication terminal 70 managed by the communication management system 50.

The management unit 53 uses the terminal management DB 5002 to manage the first communication terminal 10 and the second communication terminal 70 each of which are logging in. The terminal management DB 5002 is a database that stores the communication ID and the communication terminal Internet Protocol (IP) address so as to be associated to each other, of the first communication terminal 10 and the second communication terminal 70 that are logging in.

The session control unit 58 controls a session for transmitting content data between the first communication terminal 10 and the second communication terminal 70. This control includes control for establishing a session, control for causing the first communication terminal 10 and the second communication terminal 70 to participate in an established session, control for exiting the first communication terminal 10 and the second communication terminal 70 from the session.

The writing/reading unit 59 writes data in the storage unit 5000 and reads data from the storage unit 5000.

Processing/Operation of Communication System

Processing and operation of the communication system 1 is described below.

Figure 7:
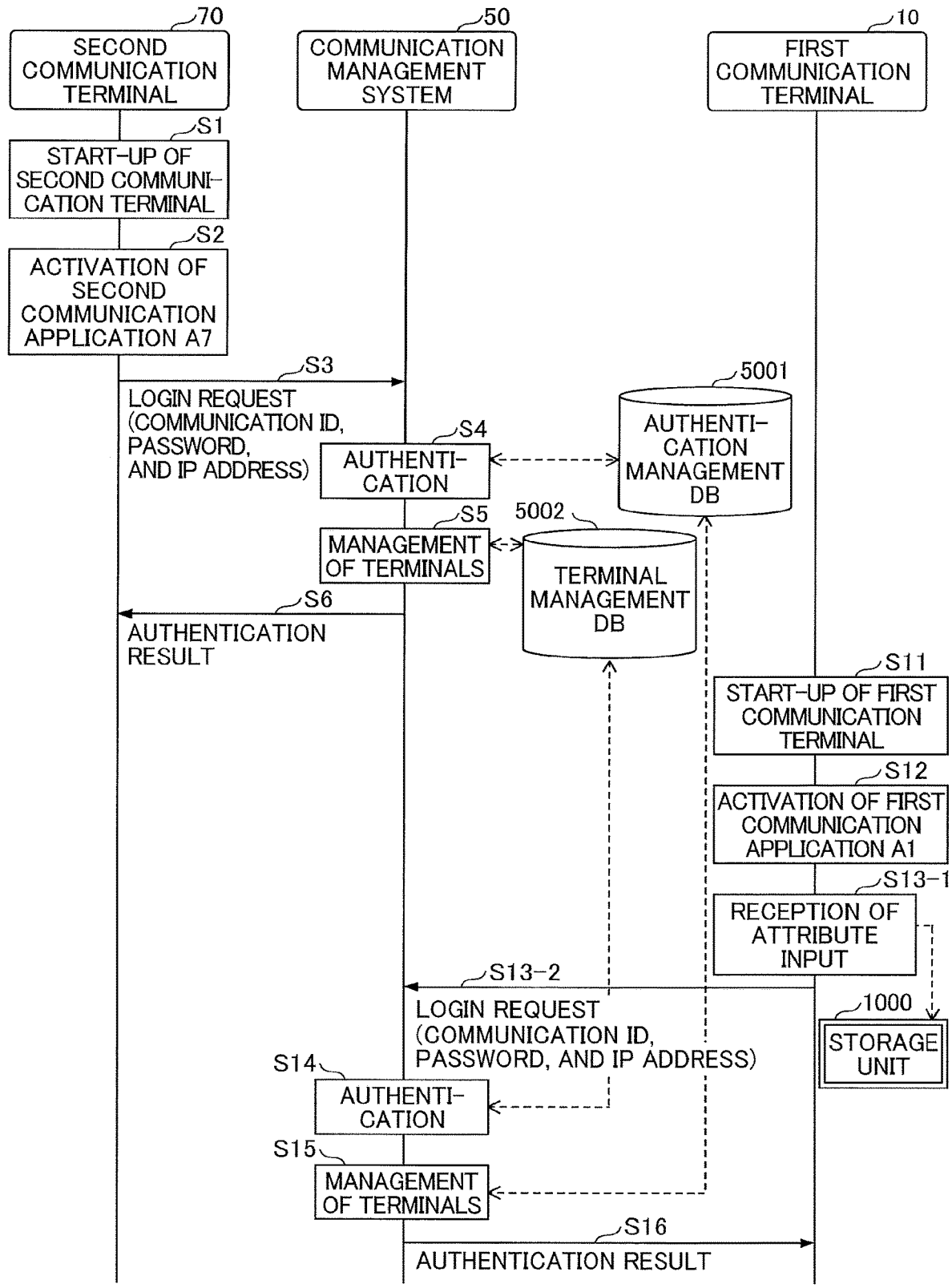
FIG. 7 is a sequence diagram for explaining operation in which the first communication terminal and the second communication terminal log into the communication management system according to the first embodiment.

FIG. 7 is a sequence diagram for explaining operation in which the first communication terminal 10 and the second communication terminal 70 log into the communication management system 50 according to the first embodiment.

In response to turning on of the power switch 709 of the second communication terminal 70 by the user, the operation input receiving unit 72 accepts an instruction for turning on, and the second communication terminal 70 is turned on to be activated, namely starts (S1). In response to the start-up of the second communication terminal 70, the activator 73 activates the second communication application A7, which is installed in the second communication terminal 70 (S2). The processing performed in the second communication terminal 70 after S2 is implemented by the second communication application A7.

The transmitting/receiving unit 71 of the second communication terminal 70 transmits a login request to the communication management system 50 through the communication network 2 in response to the activation of the second communication application A7 (S3). The login request includes a communication ID that identifies a source of the login request and a password. The source of the login request is an own terminal, namely, the second communication terminal 70, here. In the first embodiment, the communication ID of the second communication terminal 70 starts with an initial letter of "C" with which the second communication terminal 70 in a customer side is identifiable. Hereinafter, the communication IDs of the second communication terminal 70$x$ and the second communication terminal 70$y$ are to be "C01" and "C02", respectively.

The transmitting/receiving unit 51 of the communication management system 50 receives the login request from the second communication terminal 70. The communication management system 50, which is a receiving side, acquires an IP address of the second communication terminal 70, which is a transmitting side by receiving the login request transmitted from the second communication terminal 70.

Subsequently, the authentication unit 52 of the communication management system 50 searches an authentication management table in the authentication management DB 5001 using the communication ID and the password included in the login request as a search key to determine whether to authenticate the second communication terminal 70 according to determination of whether the same communication ID and the same password are stored in the authentication management table (S4).

FIGS. 8A to 8E are examples of tables used by the second communication terminal 70 and the communication management system 50 according to the first embodiment.

(Authentication Management Table)

FIG. 8A is an example of the authentication management table. The authentication management table stores a record kept for each communication ID of the first communication terminal 10 or the second communication terminal 70, which is managed by the communication management system 50. The authentication management table is included in the authentication management DB 5001. The record includes a communication ID and a password used for the authentication.

When the authentication unit 52 determines that the login request is transmitted from the second communication terminal 70 that has a permission for use and authenticates the second communication terminal 70, the management unit 53 stores, in the terminal management table of FIG. 8B, the communication ID and the 1P address of the second communication terminal 70, which is the source of the login request, in association with one another (S5). Through this, the currently logged in communication terminal, the second communication terminal 70, becomes accessible.

(Terminal Management Table)

FIG. 8B is an example of the terminal management table. The terminal management table is included in the terminal management DB 5002. The terminal management table stores a record kept for each communication ID of the first communication terminal 10 or the second communication terminal 70 which is currently logged in. The record includes a communication ID and an IP address of each of the first communication terminals 10 and the second communication terminal 70.

The transmitting/receiving unit 51 of the communication management system 50 transmits authentication result information indicating an authentication result obtained from the authentication unit 52, to the second communication terminal 70, which is the source of the login request, through the communication network 2 (S6). The second communication terminal 70 receives the authentication result at the transmitting/receiving unit 71.

In response to turning on of the power switch 109 of the first communication terminal 10 in an operator side by the user, the operation input receiving unit 12 accepts the instruction for turning on, and the first communication terminal 10 turns on to be activated, namely, starts (S11). In response to the start-up of the first communication terminal 10, the activator 13 activates the first communication application A1 installed in the first communication terminal 10 (S12). The processing performed in the first communication terminal 10 is implemented by the first communication application A1.

Subsequently, the output unit 14 of the first communication terminal 10 outputs to the display 120 a reception screen for receiving an input of the attribute of the operator who is the user of the first communication terminal 10.

FIG. 9 is an illustration of an example of the reception screen 140 displayed with the first communication terminal 10 according to the first embodiment. On the reception screen 140, in addition to spaces for receiving the input of the communication ID and the password, languages as the attribute of the operator, more specifically, the languages that the operator is able to use, and checkboxes each of which is for selecting a corresponding language are displayed. When the operator selects one or more languages, which the operator is able to use, and press an OK button on the reception screen 140, the operation input receiving unit 12 accepts an input of the attribute of the operator (step S13-1). The writing/reading unit 19 stores attribute information corresponding to the attribute selected in the storage unit 1000.

The first communication terminal 10 sends a login request to the communication management system 50 in response to activation of the first communication application A1 and logs into the communication management system 50 (S13-2, S14, S15, and S16). This processing is substantially the same as the processing of S3, S4, S5, and S6 that is performed between the second communication terminal 70 and the communication management system 50. However, the communication ID sent with the login request from the first communication terminal 10 to the communication management system 50 has an initial letter, "O", to be identified as the first communication terminal 10 in the operator side.

Hereinafter, the communication IDs of the first communication terminals 10a, 10b, and 10c are to be "O01", "O02", and "O03", respectively. The authentication of the first communication terminal 10, which is a source of the login request, is succeeded, the first communication terminal 10 logs into the communication management system 50.

Referring to FIG. 10, which is FIG. 10A and FIG. 10B, operation of transmitting presence information indicating a state of the operator side from the first communication terminal 10 to the second communication terminal 70 is described according to the embodiment. FIG. 10A and FIG. 10B (FIG. 10) are a sequence diagram for explaining an example of operation of transmitting presence information according to the first embodiment. In the description below, the second communication terminal 70x and the second communication terminal 70y are successfully authenticated and currently logged into the communication management system 50.

The writing/reading unit 19 stores an event that triggers transition of a state indicated as presence and the presence, after the transition, in the storage unit 1000, when the event occurs. The presence is used to determine whether the operator who is the user of the first communication terminal 10 is able to start a call. The presence indicating a communicable state in which the user is able to start a call includes "Online". More specifically, "Online" indicates that the first communication terminal 10 is currently logged in the communication management system 50 but not communicating with the second communication terminal 70 in the customer side. The presence indicating a communicable state in which the user is not able to start a call includes "Offline" and "Chat". More specifically, "Offline" indicates that the first communication terminal 10 is not logged in the communication management system 50, and "Chat" indicates that the first communication terminal 10 is currently logged in the communication management system 50 and already started communicating with the second communication terminal 70 in the customer side, so that the user is unable to start a new communication. The information used as the presence, as described above, is not limiting of the first embodiment, but any information other than above-mentioned information is able to be used for determining communicable or non-communicable, more specifically, whether the user is able to start a call or communication. Additionally, the presence may include information that is based on an input of the user. Such presence that is based on the input of the user is, for example, "being absent" that indicates non-communicable, more specifically, the user is unable to start a call or communication.

Examples of the event that triggers the transition to "Online" includes reception of the authentication result information at S16 by the first communication terminal 10, acceptance of an input of a call end request from the user, and the like. One example of the event that triggers the transition to the presence, "Offline", is a log-out of the first communication terminal 10 from the communication management system 50. An example of an event that triggers the transition to the presence, "chat", is establishment of a communication between the second communication terminal 70 and the first communication terminal 10 (S95, which is described later). Note that each of the events and the presence states described above is merely an example, and does not limit the embodiment described above. Additionally, note that the event that triggers the transition of the presence is not particularly limited as long as it is detectable, and is able to be appropriately set according to a communication protocol and contents of processing performed with the first communication application A1.

When any one of the events described above occurs in the first communication terminal 10a (S21), the writing/reading unit 19 reads the attribute information, such as "en", "zh", "es", or the like from the storage unit 1000. The attribute information to be read corresponds to, for example, one or more of "English", "Chinese", "Spanish", and the like" input by the operator, who is the user of the first communication terminal 10a, at a time of the log-in (see S13-1). The transmitting/receiving unit 11 of the first communication terminal 10a transmits the communication ID "O01" of the first communication terminal 10a and the presence information including the presence indicating the state after transition due to the occurrence of the event of S21 and the attribute information read from the storage unit 1000 to the communication management system 50 (S22). When receiving the authentication result at S16, the first communication terminal 10a transmits the presence information including the presence, "Online", to the communication management system 50. Additionally, when the login request is accepted, the first communication terminal 10a transmits the presence information including the presence, "Offline", to the communication management system 50. When establishing a communication with the second communication terminal 70, the first communication terminal 10a transmits the presence information including the presence "Chat" to the communication management system 50. While the attribute information is not updated after the attribute information is registered in the storage unit 1000 in S13-1, the first communication terminal 10a transmits the presence information including the same attribute information to the communication management system 50 each time when the event occurs.

Upon receiving the presence information transmitted from the first communication terminal 10a, the transmitting/receiving unit 51 of the communication management system 50 transmits the received presence information to the second communication terminal 70x and the second communication terminal 70y, in the customer side, currently logged in the communication management system 50 (S23 and S24). A method of identifying the second communication terminal 70 on the customer side that is currently logging in the communication management system 50 is not particularly limited. As an example, there is a method of using the terminal management table (see FIG. 8B), and reading the communication ID having "C" as an initial letter from the terminal management table of 8B.

Each transmitting/receiving unit 71 of the second communication terminal 70x and the second communication terminal 70y receives the presence information transmitted from the first communication terminal 10a in the operator side via the communication management system 50. Each writing/reading unit 79 of the second communication terminal 70x and the second communication terminal 70y records the communication ID, the presence and the attribute information included in the received presence information in the destination management table (see FIG. 8C) (S25, S26). When a record having the same communication ID as the communication ID included in the received presence information is in the destination management table, the writing/reading unit 79 overwrites the record based on the presence information that is newly received. Through this, the second communication terminal 70x and the second communication terminal 70y acquire the latest presence in the side of the first communication terminal 10a.

(Destination Management Table)

FIG. 8C is an example of the destination management table. The destination management table is included in the destination management DB 7001. As illustrated in the destination management table, a record is stored for each communication ID of the first communication terminal 10, which is a destination candidate, used by the operator. The record includes a communication ID, presence indicating a state of a corresponding destination candidate, and attribute information indicating the attribute of the destination candidate.

When any one of the above-mentioned events occurs in the first communication terminal 10b in the operator side, the same processing as that of S21, S22, S23, S24, S25, and S26 performed among the first communication terminal 10a, the communication management system 50, the second communication terminal 70x, and the second communication terminal 70y is performed among the first communication terminal 10b, communication management system 50, the second communication terminal 70x, and the second communication terminal 70y, (S31, S32, S33, S34, S35, and S36). When any one of the above-mentioned events occurs in the first communication terminal 10c in the operator side, the same processing as that of S21, S22, S23, S24, S25, and S26 performed among the first communication terminal 10a, the communication management system 50, the second communication terminal 70x, and the second communication terminal 70y, is performed among the first communication terminal 10c, the communication management system 50, the second communication terminal 70x, and the second communication terminal 70y (S41, S42, S43, S44, S45, S46). Through this, the second communication terminal 70x and the second communication terminal 70y acquire the latest presence of the side of the first communication terminal 10b and the first communication terminal 10c.

Figure 11A:
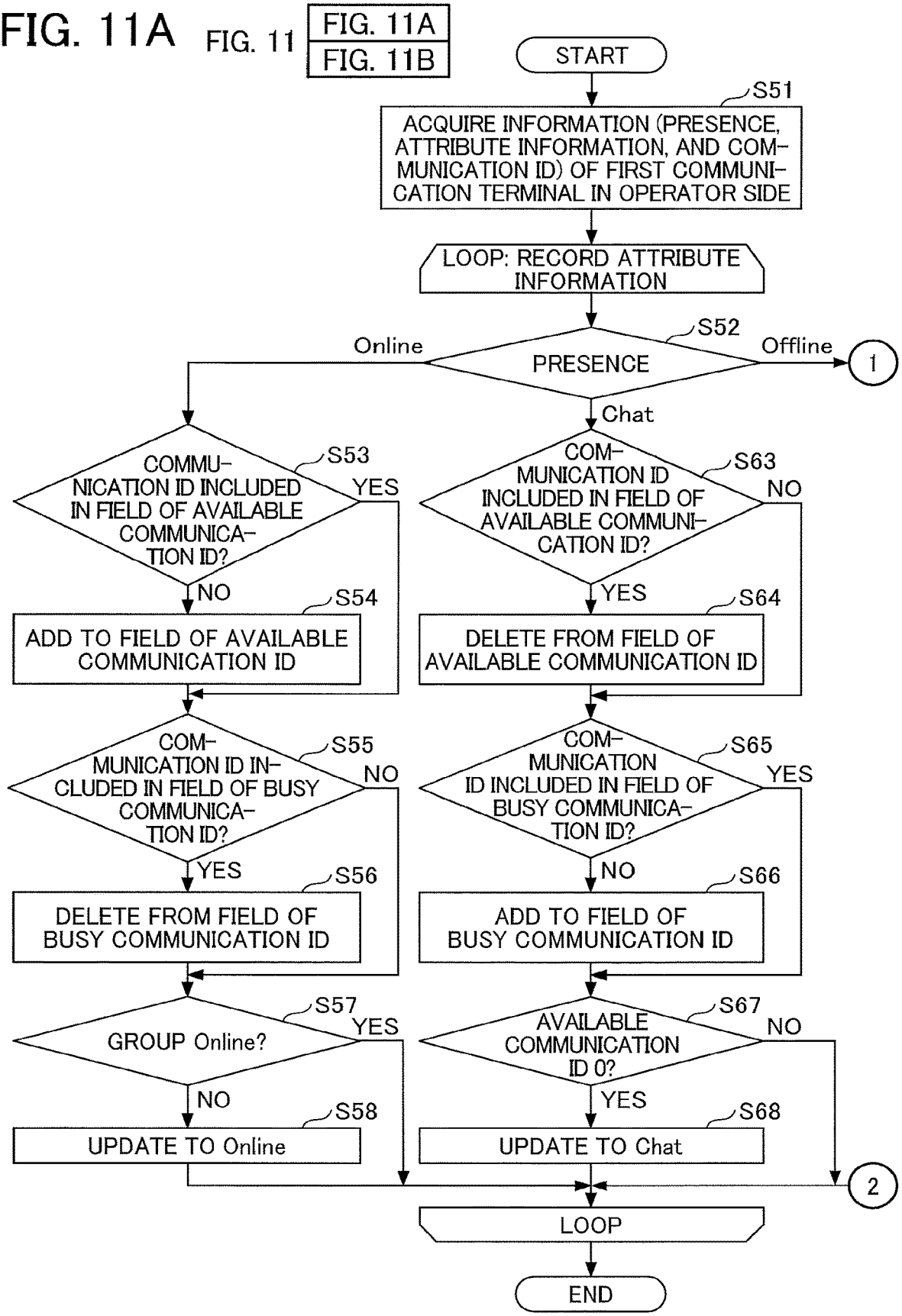

Referring now to FIG. 11, which includes FIG. 11A and FIG. 11B, operation of obtaining the presence of a group for each attribute is described according to an embodiment of the present disclosure. FIG. 11A and FIG. 11B (FIG. 11) are a flowchart illustrating operation of acquiring presence for each attribute according to the first embodiment. The presence of a group for each attribute is presence (Online, Offline, or Chat) for each attribute (en, zh, ko, pt, es, th, or ru), and, hereinafter, referred to as group presence. For example, the group presence of "en" is determined based on the presence of the destination candidate(s) (communication terminal 10) corresponding to "en". That is, if any one of the destination candidates is "Online", the group presence of "en" is "Online". If no destination candidate is "Online", and any one of the destination candidates is "Chat", the group presence is "Chat". If all of the destination candidates are "Offline", the group presence is "Offline".

An example of processing for determining the group presence is described below. Processing of the second communication terminal 70x is described below, but the second communication terminal 70y also performs the same processing.

The state management unit 75 of the second communication terminal 70x acquires information in the record each time when the presence in the record kept in the destination management table (see FIG. 8C) is updated in S26, S36, and S46 in FIG. 10 (S51). The acquired information includes the communication ID of the first communication terminal 10, which is the source of the presence information, the presence indicating the latest state of the destination candidate, and the attribute information indicating the attribute of the destination candidate.

The state management unit 75 of the second communication terminal 70x updates each record including the attribute information acquired in S51, in the presence management table (see FIG. 8D). That is, for example, when the acquired attribute information is "en", "zh", and "es", the state management unit 75 updates each record including the attribute information "en", "zh", or "es" in the presence management table.

(Presence Management Table)

FIG. 8D is an example of the presence management table. The presence management table is included in the presence management DB 7002. In the presence management table, a record is stored for attribute information indicating each attribute of the destination candidate. The record includes the attribute information, the presence of a group of destination candidates in association with the attribute relating to the attribute information, a communication ID (available communication ID) of the first communication terminal 10 that is the destination candidate having the presence of "Online", among the destination candidates in association with the attribute, with which a call is able to be made (communicable), and a communication ID (busy communication ID) of the first communication terminal 10 that is the destination candidate having the presence of "Chat" indicating currently busy, among the destination candidates in association with the attribute.

As an example, a description is given of a process performed when the presence information "Online, (en, zh, es), O01" is transmitted from the first communication terminal 10a to the second communication terminal 70x and the presence information is acquired in S51 (S52: Online).

A loop process of updating the record in which "en" is recorded as the attribute information, in the presence management table is described below. The state management unit 75 of the second communication terminal 70x refers to a field of the available communication ID that indicates a call is able to be made, of the record in which the attribute information "en" is recorded in the presence management table (see FIG. 8D). By referring to the presence management table as described above, the state management unit 75 deter mines whether or not the communication ID "O01" obtained in S51 is included in the field of the available communication ID (S53).

When determining that the communication ID "O01" obtained in S51 is not included in the field of the available communication ID of the presence management table (NO in S53), the state management unit 75 adds the obtained communication ID "O01" to the field of the available communication ID (S54).

When the processing of S54 is completed, or when S53 is YES, the state management unit 75 of the second communication terminal 70x refers to the presence management table (see FIG. 8D) and checks a field of the busy communication ID of the record in which "en" is recorded as the attribute information. By referring to the presence management table as described above, the state management unit 75 determines whether or not the communication ID "O01" obtained in S51 is included in the field of the busy communication ID (S55).

When the state management unit 75 determines that the communication ID "O01" obtained in S51 is included in the field of the busy communication ID of the presence management table (YES in S55), the obtained communication ID "O01" is deleted from the field of the busy communication ID (S56). Through the processing described above, the communication ID of the first communication terminal 10a is recorded in the field of the available communication ID in both cases where the presence of a first communication terminal 10a side transitions from "Chat" to "Online" and from "Offline" to "Online", as long as the record includes "en" as the attribute information, in the presence management table.

In the case where the process of S56 is completed or in the case of NO in S55, the state management unit 75 of the second communication terminal 70x refers to the record in which the attribute information, "en", for the group presence in the presence management table (see FIG. 8D), and determined whether the group presence is "Online" (S57).

When determining that the group presence in the record having "en" as the attribute information is not "Online" (NO in S57), the state management unit 75 updates the presence to "Online". When determining that the group presence in the record having "en" as the attribute information, is "Online" (YES in S57), the state management unit 75 does not update the group of presence in the record having "en" as the attribute information. Through the processing described above, the group presence of the records in which "en" is recorded as the attribute information, in the presence management table, is to be "Online".

The attribute information "en", "zh", and "es" is obtained in S51, and the state management unit 75, accordingly, performs the loop process for the records in each of which the attribute information "zh" or "es" is included in the presence management table, in the same way as the processing performed for "en". When the loop process is completed, the presence management table in FIG. 8D becomes as illustrated in Table 1

TABLE 1

| Attribute Information | Group Presence | Available Communication ID | Busy Communication ID |
|---|---|---|---|
| en | Online | O01, O02 | |
| zh | Online | O01 | |
| ko | Online | O03 | |
| pt | Online | O02, O03 | |
| es | Online | O01, O02 | |
| th | Online | O03 | |
| ru | Online | O02 | |

Subsequently, a process performed in a case where the presence information, "Chat, (en, zh, es), O01" is transmitted from the first communication terminal 10a to the second communication terminal 70x and the presence information is obtained in S51 is described (Chat in S52).

A loop process of updating the record in which the attribute information, "en", is recorded in the presence management table is described below. The state management unit 75 of the second communication terminal 70x refers to the field of the available communication Ill of a record having "en" as the attribute information in the presence management table (See Table 1). By referring the presence management table, the state management unit 75 determines whether or not the communication ID "O01" obtained in S51 is included in the field of the available communication ID (S63).

When the state management unit 75 determines that the communication ID "O01" obtained in S51 is included in the field of the available communication ID in the presence management table (YES in S63), the obtained communication ID "O01" is deleted from the field of the available communication ID (S64).

When S64 is completed, or when S63 is NO, the state management unit 75 of the second communication terminal 70x refers to the presence management table (See Table 1) for a field of the busy communication ID in a record in which the attribute information "en" recorded. By referring the presence management table, the state management unit 75 determines whether or not the communication ID "O01" obtained in S51 is included in the field of the busy communication ID (S65).

When the state management unit 75 determines that the communication ID "O01" obtained in S51 is not included in the field of the busy communication IT) in the presence management table (NO in S65), the obtained communication ID "O01" is added to the field of the busy communication ID (S66). Through the processing described above, the communication ID of the first communication terminal 10a is recorded in the field of the busy communication ID of the record having "en" as the attribute information in the presence management table.

When the processing of S66 is completed, or when S65 is YES, the state management unit 75 of the second communication terminal 70x refers to the presence management table (See FIG. 8D) for the field of the available communication ID of the record having "en" as the attribute information. Through this, the state management unit 75 determines whether the number of the communication IDs recorded in the field of the available communication ID of the record having "en" as the attribute information is 0 (S67).

When the number of communication IDs recorded in the field of the available communication ID of the record having "en" as the attribute information is 0 (YES in S67), the state management unit 75 updates the group presence of the record having "en" as the attribute information to "Chat" (S68). When the number of the communication Ills recorded in the field of the available communication ID of the records having "en" as the attribute information is 0 (NO in S67), the state management unit 75 does not update the group of the record having "en" as the attribute information. That is, when the communication ID is recorded in the field of the available communication ID of the record having "en" as the attribute information, corresponding presence remains as "Online" without being updated.

The attribute information "en, zh, es" is obtained in S51, and the state management unit 75, accordingly, performs the loop process for the records in each of which the attribute information "zh" or "es" is included in the presence management table, in the same way as the processing performed for "en". Accordingly, the presence management table of Table 1 becomes as Table 2.

TABLE 2

| Attribute Information | Group Presence | Available Communication ID | Busy Communication ID |
|---|---|---|---|
| en | Online | O02 | O01 |
| zh | Chat | | O01 |
| ko | Online | O03 | |
| pt | Online | O02, O03 | |
| es | Online | O02 | O01 |
| th | Online | O03 | |
| ru | Online | O02 | |

A case where presence information "Offline, (ko, pt), O03" is transmitted from the first communication terminal 10c to the second communication terminal 70x and the presence information is obtained in S51 is described (S52: Offline).

A loop process of updating a record in which the attribute information, "ko", is recorded in the presence management table is described below. The state management unit 75 of the second communication terminal 70x refers to the field of the available communication ID of the record in which "ko" is recorded as the attribute information in the presence management table (see Table 2). By referring the present management table, the state management unit 75 determines whether or not the communication ID, "O03", obtained in S51 is included in the field of the available communication ID (S73).

When the determination indicates that the communication IL), "O03", obtained in S51 is included in the field of the available communication ID in the presence management table (YES in S73), the obtained communication ID "O03" is deleted from the field of the available communication ID (S74).

When S74 is completed, or when S73 is NO, the state management unit 75 of the second communication terminal 70x refers to the presence management table (See Table 2) for the field of the busy communication ID of the record in which "ko" is recorded as the attribute information. Through this, the state management unit 75 determines whether or not the communication ID, "O03", obtained in S51 is included in the field of the busy communication ID (S75).

When the determination indicates that the communication ID, "O03", obtained in S51 is included in the field of the busy communication ID in the presence management table (YES in S75), the obtained communication ID, "O03", is deleted from the field of the busy communication ID (S76). Through the processing described above, the communication ID of the first communication terminal 10c is deleted from the record in which "ko" is recorded as the attribute information in the presence management table.

When S76 is completed, or when S75 is NO, the state management unit 75 of the second communication terminal 70x refers to the presence management table (See Table 2) for the field of the busy communication ID of the record in which "ko" is recorded as the attribute information. By referring to the presence management table, the state management unit 75 determines whether one of the condition IF1 and the condition IF2 is met and which one of the condition IF1 and the condition IF2 is met (S77). The condition IF1 is that the number of the communication IDs recorded in the field of the available communication ID is 0 and the number of the communication ID recorded in the field of the busy communication ID of the record having "ko" as the attribute information is not 0. The condition IF2 is that the number of the communication IDs recorded in the field of the available communication ID of the record having "ko" as the attribute information is 0 and the number of the communication IDs recorded of the field of the busy communication ID of the record having "ko" as the attribute information is 0.

When the number of the communication IDs recorded in the field of the available communication ID of the record having "ko" as the attribute information is 0 and the number of the communication IDs recorded in the field of the busy communication ID is not 0 (S77: IF1), the state management unit 75 updates the group presence of the recode in which the attribute information "ko" is recorded to "Chat" in the presence management table (S78). When the number of the communication IDs included in the field of the available communication ID of the record in which "ko" is recorded as the attribute information is 0 and the number of the communication IDs included in the field of the busy communication ID is 0 (S77: IF2), the state management unit 75 updates the group presence of the recode in which the attribute information of "ko" is recorded to "Offline" in the presence management table (S79). If determination of S77 is not either IF1 or IF2 (S77: NO), the state management unit 75 remains the group presence of the record having the attribute information of "ko" as "Offline" without updating.

The attribute information, "ko, pt", is obtained in S51, and the state management unit 75, accordingly, performs the loop process for the record in which the attribute information "pt" is included in the presence management table, in the same way as the processing performed for "ko". Through this, the presence management table of Table 2 becomes as Table 3.

TABLE 3

| Attribute Information | Group Presence | Available Communication ID | Busy Communication ID |
|---|---|---|---|
| en | Online | O02 | O01 |
| zh | Chat | | O01 |
| ko | Offline | | |
| pt | Online | O02 | |
| es | Online | O02 | O01 |
| th | Online | O03 | |
| ru | Online | O02 | |

Figure 12B:
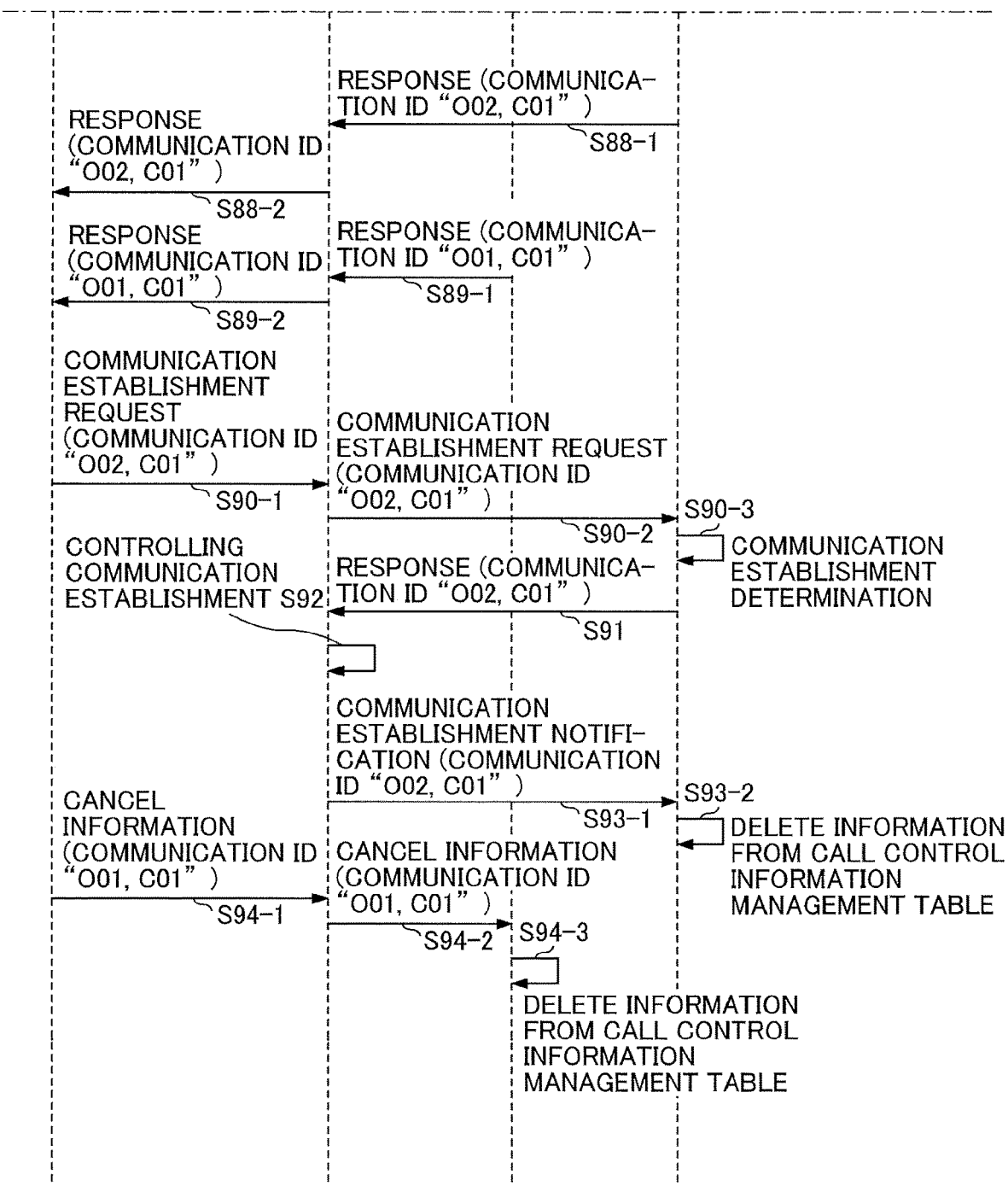

Operation of starting communication is described with reference to FIG. 12. FIG. 12A and FIG. 12B (FIG. 12) are a sequence diagram illustrating an example of operation of starting a communication according to the first embodiment. As an example, a description is given of operation of starting communication with the second communication terminal 70x. In the description below, the second communication terminal 70x is replaceable with the second communication terminal 70y.

The operation input receiving unit 12 of the second communication terminal 70x receives a display request for displaying a list of attributes of the destination candidates according to user input. In response to the display request, the output unit 74 obtains a set of information including the attribute information corresponding to each attribute recorded in the presence management table (see Table 3) and the group presence corresponding to each attribute. The storage unit 7000 stores data representing a display image corresponding to the attribute information and the group presence in advance. For example, the data representing the display image includes text data, representing "English", of the attribute information corresponding to "en". As another example, the data for the display image includes icon data indicating the group presence corresponding to each of "Online", "Offline", and "Chat". The image data of "Online", "Offline", and "Chat" represent an icon with a check mark, an icon with no image, and an icon with a balloon(s), respectively. The output unit 74 acquires from the storage unit 7000 a set of display image data including the text data and the icon data used to display text and icon for obtained each set of information including the attribute information and the group presence. The output unit 74 generates image data of the list of the attribute (attribute list) by arranging the acquired sets of data in a display area in a manner that each text data and each icon data in a corresponding set of data are arranged in the same line and associated with each other. The output unit 74 outputs the generated image data of the attribute list to the display 720 (S81).

Figure 13:
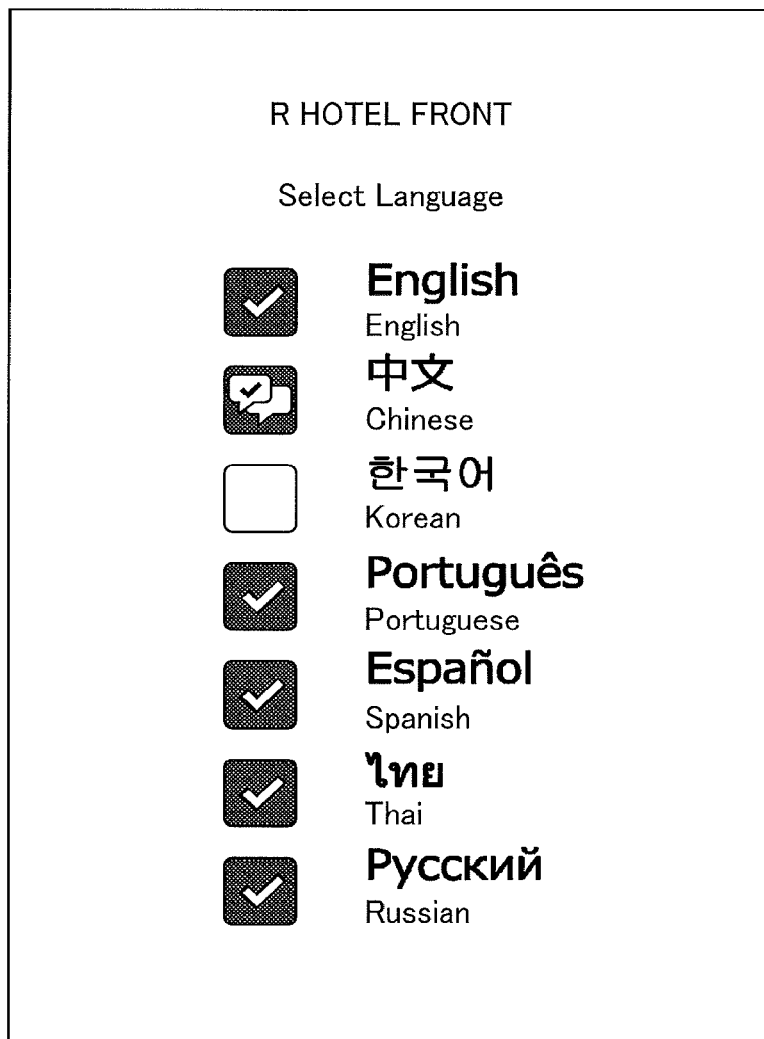
FIG. 13 is an illustration of an example of an attribute list displayed with the second communication terminal according to the first embodiment.

FIG. 13 is an illustration of an example of the attribute list displayed with the second communication terminal 70 according to the first embodiment. The display example of FIG. 13 corresponds to Table 3, which is the presence management table.

The output unit 74 repeatedly perform the above-described operation each time when the presence management table is updated. Through this, the attribute list indicating the latest group presence for each attribute is displayed on the display 720.

As illustrated in FIG. 13, the output unit 74 outputs the icons with the check marks, each of which is corresponding to "Online", as selectable ones of all icons, and outputs a icon with no image corresponding to "Offline" or the balloons corresponding to "Chat" as non-selectable icons, in S81. For example, when the user performs input operation by pressing the icon with no image corresponding to "Korean" or the icon with the balloons corresponding to "Chines" in the attribute list illustrated in FIG. 13, the operation input receiving unit 72 does not accept the input. Additionally, when the user performs the input operation by pressing the icon with no image or with balloon, the output unit 74 may display on the display 720 a message indicating that the communication is unable to be started or a message to indicate that the user has to wait until the communication is able to be started.

In the screen illustrated in FIG. 13, when any one of the icons with the check marks corresponding to the attribute information, "English", "Portuguese", "Spanish", "Thai", or "Russian" is pressed by the user, the operation input receiving unit 72 accepts the selection of the attribute corresponding to the icon (S82). For example, when the icon with the check mark corresponding to "English" is pressed, the operation input receiving unit 72 accepts "English" as an attribute of the destination candidate. That is, the attribute information of the destination candidate is "en".

When the selection of the attribute is accepted, the writing/reading unit 79 searches the destination management table (see FIG. 8C) for a corresponding set of the communication ID and the presence using the attribute information, "en", which is selected in S82, as a search key (S83). For example, when the attribute information indicating the attribute selected in S82 is "en", "O01, Chat" and "O02, Online" is read out from the destination management table of FIG. 8C.

The transmitting/receiving unit 71 of the second communication terminal 70x transmits a communication start request including the communication Ill with the presence of "Online" from the communication IDs read in S83, "O02", the communication ID of the second communication terminal 70x that is the source of the communication start request, "C01", and the attribute information, "en", indicating the attribute selected in S82 to the communication management system 50 (S84-1).

On receiving the communication start request transmitted from the second communication terminal 70x, the transmitting/receiving unit 51 of the communication management system 50 transfers the communication start request to the first communication terminal 10b that is identified with the communication ID "O02" included in the received communication start request (S84-2).

When the destination management table is updated in S26, S36, and S46 illustrated in FIG. 10 during a period from the transmission of the communication start request to the reception of a response of the request, the second communication terminal 70x repeats the processing of S83. When the presence of the first communication terminal 10a side is updated to "Online", for example, the communication ID "O01" is selected as a destination of the communication start request. The transmitting/receiving unit 71 of the second communication terminal 70x transmits the communication start request including the communication ID, "O01", to the communication management system 50 (S85-1). The communication start request sent in this case also includes the attribute information indicating the attribute, "en" selected in S82, and the communication ID "C01", which is own communication ID, indicating the source terminal of the communication start request, which is the second communication terminal 70x.

On receiving the communication start request transmitted from the second communication terminal 70x, the transmitting/receiving unit 51 of the communication management system 50 transfers the communication start request to the first communication terminal 10a identified with the communication ID, "O01", included in the received communication start request (S85-2).

The transmitting/receiving units 11 of the first communication terminal 10a and the first communication terminal 10b receive the communication start request sent from the second communication terminal 70x via the communication management system 50. On receiving the communication start request, each of the output units 14 of the first communication terminal 10a and the first communication terminal 10b outputs on the display 720 a message including information on the source of the request corresponding to the communication ID "C01" included in the communication start request and attribute information corresponding to the attribute information "en" included in the communication start request.

Figure 14:
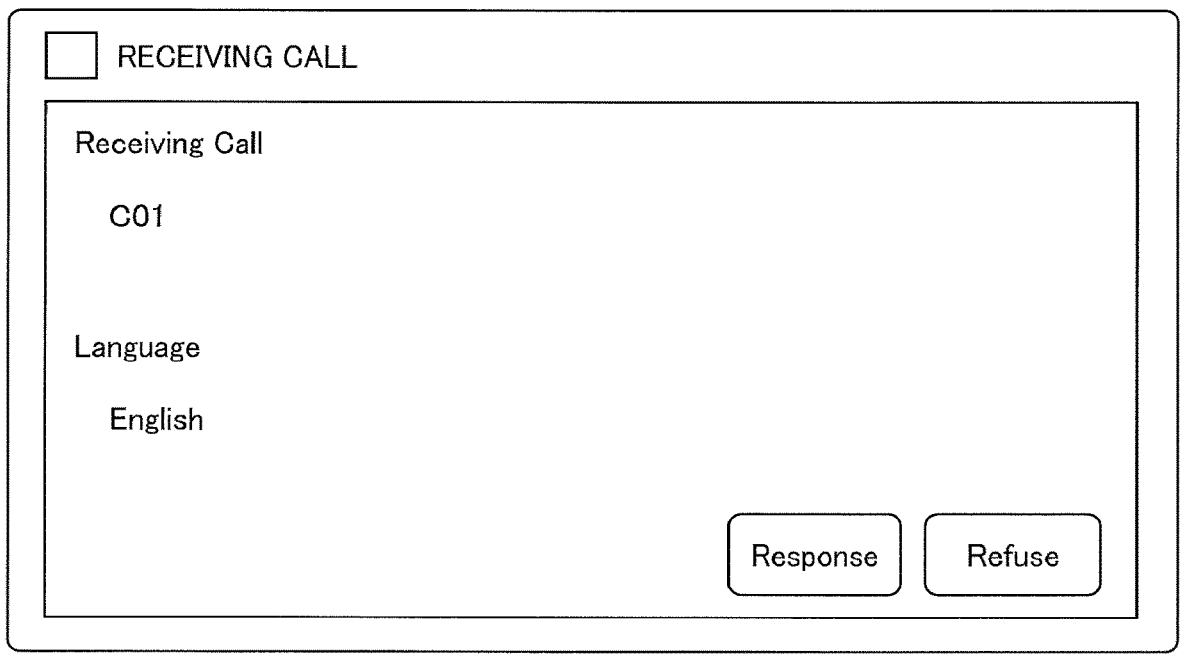
FIG. 14 is a diagram illustrating an example of a message displayed with the first communication terminal according to the first embodiment.

FIG. 14 is a diagram illustrating an example of a message displayed with the first communication terminal 10 according to the first embodiment. Displaying the attribute on the screen displaying the message allows the operator, which is the user of the first communication terminal 10 to know which language the operator is to use, before starting the communication.

The screen displaying the message as illustrated in FIG. 14 includes a response button for an acceptation of starting the communication. When the user presses the response button on the screen with each of the first communication terminal 10a and the first communication terminal 10b, the operation input receiving unit 12 of each of the first communication terminal 10a and the first communication terminal 10b accepts the input with the response button for response acceptation (S86-1 and S87-1).

When the input for the response acceptation is accepted, the communication establishment determination unit 15 updates a call control information management table (see FIG. 8E) (S86-2 and S87-2). In response to accepting the communication start request from the second communication terminal 70x corresponding to the communication ID, "C01", the writing/reading unit 19 stores a record including "C01" in the call control information management table.

(Call Control Information Management Table)

FIG. 8E is an example of the call control information management table. The call control information management table is included in the call control information management DB 1001. The call control information management table includes a record having the communication ID of the second communication terminal 70 that sends the communication start request and the request is accepted. The record includes an item of the communication ID, an item of call receiving time and an item of the attribute information. The call receiving time is a time at which the communication start request is received. The attribute information is attribute information included in the communication start request.

Subsequently, the transmitting/receiving units 11 of each of the first communication terminals 10a and 10b transmits response information including the communication ID "C01" that is a communication ID of the source of the communication start request, and the communication ID "O01" or "O02", which is own communication ID, namely the communication ID of the first communication terminal 10a or 10b, to the communication management system 50 (S88-1 and S89-1). The process described above is one of the examples, and in another one of the embodiments, the transmitting/receiving unit 11 of each of the first communication terminals 10 automatically sends a response of the communication start request to the second communication terminal 70. Additionally, in still another one of the embodiments, the transmitting/receiving unit 11 of the first communication terminal 10, when receiving two or more communication start requests from two or more second communication terminals 70, may send a response to one, of the two or more second communication terminals 70, from which the first communication terminal 10 receives the communication request first.

The first communication terminal 10 suspends the other communication start request after receiving the input for the response acceptation in S86-1 or S87-1, if the first communication terminal receives other communication start request from other second communication terminals 70 than the second communication terminal 70x. This suspension continues until reception of a communication establishment notification (S93-1) or cancel information (S94-2).

The transmitting/receiving unit 51 of the communication management system 50 receives the response information sent from the first communication terminal 10a or 10b. The transmitting receiving unit 51 of the communication management system 50 transmits the received response information to the second communication terminal 70x identified with the communication ID "C01" included in the response information (S88-2 and S89-2).

On receiving the response information, the transmitting/receiving unit 71 of the second communication terminal 70x transmits a request for establishing a communication with the first communication terminal 10 that is the source of the response information (communication establishment request) to the communication management system 50 (S90-1). The communication establishment request includes the communication ID of won communication terminal, namely the communication ID of the second communication terminal 70x, and the communication ID of the first communication terminal 10 that is the source of the response. When receiving response information from the plurality of the first communication terminals 10, the transmitting/receiving unit 71 of the second communication terminal 70x transmits the communication establishment request including a communication ID of the first communication terminal 10 from which the second communication terminal 70x receives the request first, the communication ID "O02" of the first communication terminal 10b.

When receiving the communication establishment request, the transmitting/receiving unit 51 of the communication management system 50 transfers the communication establishment request to the first communication terminal 10b identified with the communication ID of "O02" included in the communication establishment request (S90-2).

When the transmitting/receiving unit 11 of the first communication terminal 10b receives the communication establishment request, the communication establishment determination unit 15 compares the communication ID included in the communication establishment request with the communication ID recorded in the record of the call control information management table to determine whether the second communication terminal 70x corresponding to the communication ID included in the communication establishment request appropriately follows the call control procedure. When the communication ID included in the communication establishment request matches the communication ID recorded in the record of the call control information management table, the response information including the communication ID of "C01" that is the source of the communication start request and the communication ID, "O02", which is the own communication 1D, namely, the communication ID of the first communication terminal 10b to the communication management system 50 for establishing the communication between the second communication terminal 70x and the first communication terminal 10b (S91). When the communication ID included in the communication establishment request does not match the communication ID recorded in the record of the call control information management table, the process does not proceeds to S91. Alternative to the determination processing of S91, other processing, in which the communication establishment determination unit 15 determines whether or not the time at which the determination is performed is within a predetermined time, desirably set by a user or a designer, from the call receiving time recorded in the record of the call control information management table, is used, or this determination process may be added to the processing of S91.

The transmitting/receiving unit 51 of the communication management system 50 receives the response information. Subsequently, the session control unit 58 of the communication management system 50 establishes a session to send content data of image data and audio data between the first communication terminal 10b and the second communication terminal 70x identified with the communication IIIs of "O02" and "C01", respectively, included in the response information, via the relay device 30 (S92). The session is not limited to the above session and may be a session for directly transmitting the content data between the first communication terminal 10b and the second communication terminal 70x through the communication network 2. When the communication between the first communication terminal 10b and the second communication terminal 70x is established, each of the first communication terminal 10b and the second communication terminal 70x transmits the image data representing an image captured with the own terminal and the audio data representing sound caught with the own terminal to the counterpart communication terminal via the relay device 30. The output unit 14 of the first communication terminal 10b and the output unit 74 of the second communication terminal 70x output the received content data to the displays 120 and 720 and the speakers 115 and 715, respectively. Through this, the users start the communication.

Subsequently, the transmitting/receiving unit 51 of the communication management system 50 transmits a communication establishment notification to the first communication terminal 10b (S93-1). According to another embodiment, the communication establishment notification is transmitted in parallel with S92. When the transmitting/receiving unit 11 of the first communication terminal 10b receives the communication establishment notification, the communication establishment determination unit 15 deletes the record in the call control information management table (S93-2). In another embodiment, the communication establishment determination unit 15 deletes the record from the call information table when a predetermined time elapses from the call receiving time recorded in the record of the call control information management table.

When the communication is established, the transmitting/receiving unit 11 of the first communication terminal 10b transmits the presence information including the presence of "Chat", the attribute information of "en, es, pt, ru, th" and the communication ID of "O02" to the communication management system 50 (See S22 in FIG. 10).

Additionally, when the communication is established, the second communication terminal 70x cancels other communication start requests except for the one to the first communication terminal 10b, from which the second communication terminal 70x receives the response information first. More specifically, the transmitting/receiving unit 71 of the second communication terminal 70x transmits cancel information related to the communication ID of "O01" to cancel the communication start request to the communication management system 50 (S94-1). The cancel information includes the communication ID "C01", which is the own communication ID, and the communication IDs of the first communication terminals 10, except for the one of the first communication terminals from which the response information is received first, in this case, the communication ID of the first communication terminal 10a "O01".

When receiving the cancel information, the transmitting/receiving unit 51 of the communication management system 50 transmits the cancel information to the first communication terminal 10a identified with the communication ID of "O01" included in the cancel information (S94-2). The transmitting/receiving unit 11 of the first communication terminal 10a receives the cancel information sent from the communication management system 50. This allows the first communication terminal 10a side to be informed that the response is not necessary any more to the communication start request from the second communication terminal 70x. When receiving the cancel information, the communication establishment determination unit 15 deletes the record from the call control information management table (S94-3).

According to the first embodiment described above, the first communication terminal 10 stores the communication ID of the second communication terminal 70 that sends the communication start request in the call control information management table, and determines whether the stored communication ID matches the communication ID included in the communication establishment request. The first communication terminal 10, accordingly, establishes the communication and starts the communication only in response to receiving the communication establishment request from the second communication terminal 70 that transmits the communication start request prior to the communication establishment request, when receiving a call from the second communication terminal 70 that performs call control processing before the communication establishment. This eliminates unnecessary communication establishment.

Second Embodiment

A second embodiment of the disclosure, which is a modification of the first embodiment is described below. A description is given of the second embodiment, in particular, aspects that are different from those of the first embodiment of the second embodiment. In the second embodiment, as attributes, medical specialty (department) is used in stead of the available language in the first embodiment. The available language, "English, Chinese, Korean, Portuguese, Spanish, Thai, Russian", is replaced with the medical specialty, "internal medicine, Surgery, pediatrics, ophthalmology, otolaryngology, dermatology, dentistry".

FIG. 15 is an illustration of another example of the attribute list displayed with the second communication terminal 70 according to the second embodiment (See S81). The first communication terminal 10 according to the second embodiment is used, for example, by a receptionist in a hospital having a plurality of departments. The second communication terminal 70 according to the second embodiment is used, for example, by a patient in the hospital.

The attribute is not limited to the above-mentioned attribute, but desirably set. As examples of the attribution, location of a real estate, such as "New York, London, Tokyo", and product such as "food, clothes, home electronic" are included.

As described above, the communication system 1 according to the second embodiment is able to set any desired attribute, and this causes the operator of the first communication terminal 10 to appropriately deal with any desired service.

Third Embodiment

Figure 16:
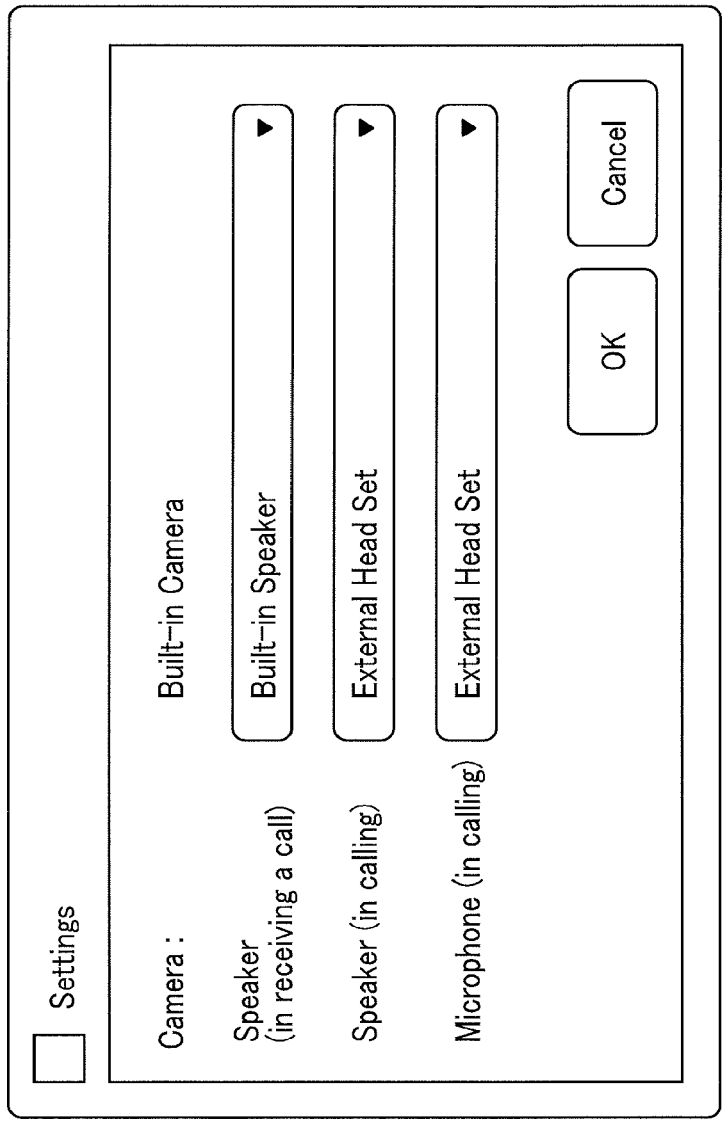
FIG. 16 is an illustration of an example of a screen for receiving a selection in association with an audio input/output device in the first communication terminal according to a third embodiment.

A third embodiment is described below by focusing on points different from each of the embodiments described above. In the third embodiment, a headset in which a microphone and a speaker are built is connected to the external device connection I/F 118 of the first communication terminal 10. In S13-1, the output unit 14 of the first communication terminal 10 further generates a screen for receiving a selection of audio input/output devices used in receiving a call and calling, and outputs the generated screen to the display 120. FIG. 16 is an illustration of an example of the screen for receiving the selection in association with the audio input/output devices in the first communication terminal 10 according to the third embodiment.

In S13-1, the operation input receiving unit 12 of the first communication terminal 10 receives the selection of the audio input/output devices used in receiving a call and calling. The IDs of the selected audio input/output devices are stored in the storage unit 1000 by the writing/reading unit 19.

When the transmitting/receiving unit 11 of the first communication terminal 10 receives the call start request in S84-2 and S85-2, the output unit 14 refers to an ID of the audio output device stored in the storage unit 1000 and outputs a receiving sound from the audio output device that is identified with the ID.

Subsequently, when communication with the second communication terminal 70 is established, the transmitting/receiving unit 11 of the first communication terminal 10 receives audio data transmitted from the second communication terminal 70. In this case, the output unit 14 of the first communication terminal 10 refers the ID of the audio output device in calling, stored in the storage unit 1000 and outputs the receiving sound from the audio output device identified with the ID. Additionally, the transmitting/receiving unit 11 of the first communication terminal 10 refers an ID of the audio input device in calling, stored in the storage unit 1000, and transmits the audio data input from the audio input device identified with the ID to the second communication terminal 70.

As described above, according to the third embodiment, the first communication terminal 10 selects the audio input/output devices to be used for each operational state in advance, resulting in appropriately switching the audio input/output devices in use according to the operational state and timing.

Supplement to Embodiment

The first communication terminal 10, the second communication terminal 70 and the communication management system 50 in the above-described embodiment may be configured by a single computer or a plurality of computers to which divided portions (functions) are arbitrarily allocated.

It should be noted that a recording medium and the HD 204 storing a program such as a program for a communication terminal in the communication system 1, a program for a relay device, or a program for communication management are to be distributed domestically or overseas as program products.

Further, although the IP address of each communication terminal is used in the terminal management table illustrated in FIG. 8B in the communication system 1, the embodiment is not limited to this case, and the fully qualified domain name (FQDN) of each or the first communication terminals 10 may be managed instead as long as an FQDN serves as communication terminal identification information for identifying each communication terminal 10 on the communication network 2. In this case, an IP address corresponding to an FQDN is obtained by a Domain Name System (DNS) server of the related art.

In the embodiment, the term "videoconference" and the term "teleconference" are interchangeably used.

In addition, although image data and audio data are described as examples of content data in the above-described embodiment, the content data is not limited to these items of data, and the content data may be touch data. In this case, a feeling obtained by a user's contact at one communication terminal side is transmitted to the other communication terminal side. Further, the content data may be smell data. In this case, a smell at one communication terminal side is transmitted to the other communication terminal side. In addition, the content data may be streaming data, which may be at least one of image data, audio data, touch data, and smell data.

In addition, although the case in which an operator provides a service to the user with the communication system 1 in the above-described embodiment, the embodiment is not limited to this case. The communication system 1 may be used in meetings, general conversation between family members or friends, or one-way presentation of information.

In the above embodiments, the first embodiment to the third embodiment, the first communication terminal 10 is an example of a communication terminal. The application data storage unit 1000 is an example of a storage unit. The transmitting/receiving unit 11 is an embodiment of a transmitting/receiving unit. The communication ID is an example of identification information. The communication establishment determination unit 15 is an example of a determination unit.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A communication terminal, the communication terminal being one of a plurality of communication terminals each of which receives a request for a communication start from a source terminal, the communication terminal comprising:
a memory configured to store identification information of the source terminal in response to the request for the communication start;
an interface configured to:
respond by transmitting a response back to the source terminal to the request for the communication start to the plurality of communication terminals; and
receive a subsequent request for communication from the source terminal, the subsequent request for communication being transmitted from the source terminal when the source terminal selects the communication terminal from the plurality of communication terminals each of which responds to the request for the communication start; and
circuitry configured to determine whether to respond to the subsequent request for communication according to a result of comparison between identification information of the source terminal that sends the subsequent request for communication and the identification information stored in the memory.

2. The communication terminal of claim 1, wherein the memory stores time indicating when the request for the communication start is received, and
the circuitry determines whether to respond to the subsequent request for communication according to the time stored in the memory.

3. The communication terminal of claim 1, wherein the circuitry deletes the information stored in the memory when communication between the communication terminal and the source terminal is established.

4. The communication terminal of claim 1, wherein the circuitry deletes the information stored in the memory when cancel information is received from the source terminal that selects the communication terminal from the plurality of communication terminals, which responds to the request for the communication start.

5. The communication terminal of claim 1, wherein the circuitry deletes the information stored in the memory when a predetermined time elapses from when the request for the communication start is received.

6. A communication system, comprising:
a source terminal;
a plurality of communication terminals each of which receives a request for a communication start from the source terminal, each communication terminal comprising:
a memory to store identification information of the source terminal in response to the request for the communication start;
an interface configured to:
respond to the request for the communication start to the plurality of communication terminals; and
receive a subsequent request for communication from the source terminal, the subsequent request for communication being transmitted from the source terminal when the source terminal selects the communication terminal from the plurality of communication terminals each of which responds to the request for the communication start; and
circuitry configured to determine whether to respond to the subsequent request for communication according to a result of comparison between identification information of the source terminal that sends the subsequent request for communication and the identification information stored in the memory.

7. A communication method, comprising:
transmitting, from a source terminal, a request for a communication start to a plurality of communication terminals;
storing identification information of the source terminal in response to the request for the communication start in a memory;
responding by transmitting a response back to the source terminal, by the plurality of communication terminals, to the request for the communication start to the plurality of communication terminals;
transmitting, after receiving the response by the plurality of communication terminals, from the source terminal to one of the plurality of communication terminals, a subsequent request for communication;
receiving, by the one of the plurality of communication terminals, the subsequent request for communication from the source terminal, the subsequent request for communication being transmitted from the source terminal when the source terminal selects the one of the plurality of communication terminals each of which responds to the request for the communication start; and
determining whether to respond to the subsequent request for communication according to a result of comparison between identification information of the source terminal that sends the subsequent request for communication and the identification information stored in the memory.

* * * * *